US012707190B2

(12) United States Patent
Afshar

(10) Patent No.: US 12,707,190 B2
(45) **Date of Patent: *Aug. 11, 2026**

(54) SYSTEMS AND METHODS FOR IMPROVED ACOUSTO-HAPTIC SPEAKERS

(71) Applicant: IMMERZ, INC., Cambridge, MA (US)

(72) Inventor: Shahriar Afshar, Encino, CA (US)

(73) Assignee: IMMERZ, INC., Cambridge, MA (US)

( * ) Notice: Subject to any disclaimer, the term of this patent is extended or adjusted under 35 U.S.C. 154(b) by 272 days.

This patent is subject to a terminal disclaimer.

(21) Appl. No.: 18/625,808

(22) Filed: Apr. 3, 2024

(65) Prior Publication Data

US 2024/0334115 A1 Oct. 3, 2024

Related U.S. Application Data

(60) Provisional application No. 63/493,935, filed on Apr. 3, 2023.

(51) Int. Cl.

| | |
|---|---|
| ***H04R 1/28*** | (2006.01) |
| ***H04R 7/12*** | (2006.01) |
| ***H04R 9/02*** | (2006.01) |

(52) U.S. Cl.

CPC ........... *H04R 1/2803* (2013.01); *H04R 7/122* (2013.01); *H04R 7/127* (2013.01); *H04R 9/025* (2013.01); *H04R 2400/03* (2013.01)

(58) Field of Classification Search

CPC ...... H04R 1/2803; H04R 7/122; H04R 7/127; H04R 9/025; H04R 2400/03

See application file for complete search history.

(56) References Cited

U.S. PATENT DOCUMENTS

| | | | | |
|---|---|---|---|---|
| 4,131,180 A * | 12/1978 | Maeda | .................. | G10K 13/00 181/166 |
| 10,979,817 B2 * | 4/2021 | Afshar | ..................... | H04R 3/14 |

* cited by examiner

*Primary Examiner* — Carolyn R Edwards
*Assistant Examiner* — Dylan Maguire Neece
(74) *Attorney, Agent, or Firm* — Foley & Lardner LLP

(57) ABSTRACT

Systems and methods relate to, among other things, a transducer capable of producing acoustic and tactile stimulation. The transducer includes a rigid mass element disposed on the diaphragm of a speaker. The mass element may optionally be removable and may have a mass selected such that the resonant frequency of the transducer falls within the range of frequencies present in an input electrical audio signal. The systems and methods advantageously benefit from both the fidelity and audio performance of a full-range speaker while simultaneously producing high-fidelity, adjustable and palpable haptic vibrations.

20 Claims, 25 Drawing Sheets

700

SYSTEMS AND METHODS FOR IMPROVED ACOUSTO-HAPTIC SPEAKERS

BACKGROUND

Today there is an increasing need to supplement multimedia systems, that present audio and visual data to a user, with additional sensory stimuli. Multimedia systems such as televisions, portable devices, and video games are being enhanced through the introduction of improved screens and network capabilities. In addition to these more traditional areas of improving user experience, another area of consideration is tactile stimulation. In combination with improved audio and visual effects, tactile stimulation can make a game or movie experience much more realistic and memorable.

Currently, there exists devices such as piezo-electric transducers that are capable of specifically providing tactile stimulation. These devices have to be controlled by a driver that is separate from the driver used to control audio or visual output. Thus, not only are they separate from audio speakers, they also require additional components for synchronized operation with the rest of the multimedia system.

There are several other types of devices such as bass shakers and multifunction transducers that provide palpable vibrations while also processing audio signals and generating sound. The bass shaker converts the bass component of an electric audio input into vibrations. Bass shakers are driven by a very low frequency signal that causes the device to resonate and thereby generate these palpable vibrations. However, these bass shakers have poor damping characteristics, resulting in lingering vibrations even after the audio/visual data has ended.

Another device that has gained some popularity in providing both audio and tactile stimulation is a multifunction transducer (MFT). MFTs comprise a speaker cone connected to a voice coil, and a magnetic assembly that provides a magnetic field in which the coil operates. Unlike regular speakers, both the voice coil and the magnetic assembly are resiliently mounted and capable of oscillating. The magnetic assembly and the speaker cone can be driven to oscillate by applying signals to the voice coil. The magnetic assembly owing to its mass and compliance of its mounting will oscillate at a relatively low frequency within the range of frequencies that are easily perceptible to a user. Although, MFT's provide both audio and tactile stimulation, their resonant frequencies are predetermined and difficult to modify without completely disassembling them.

Accordingly, a need exists for systems and methods that improve the user's interaction with the content being presented. It is desirable that the system does not distract from the content being presented. It is also desirable that the system be easy to use, portable, inexpensive, and suitable for long term use.

SUMMARY

As noted above there exists systems for providing both audio and tactile stimulations. However, these existing systems cannot mimic the fidelity and audio performance of a full range speaker while simultaneously producing high-fidelity and adjustable vibrations. The systems and methods described herein provide for such an acoustic and tactile transducer. In particular, the acousto-haptic transducer described herein may comprise a mass element disposed on the diaphragm of a speaker such as a full-range speaker. The mass element may optionally be removable and may have a mass selected such that the resonant frequency of the transducer falls within the range of frequencies present in an input electrical audio signal. The mass element may be attached to the diaphragm via a holder. The holder and the mass element may also be configured so as to avoid contact with the center region of the diaphragm and allow for sound to pass through from the center of the speaker.

In some embodiments, the systems and methods described herein provide for a tactile transducer only. For example, the acousto-haptic transducer described herein may comprise a mass element disposed on the diaphragm of a speaker such as a full-range speaker. The mass element may optionally be removable and may have a mass selected such that the resonant frequency of the transducer falls within the range of frequencies present in an input electrical audio signal. The mass element may be attached to the diaphragm via a holder. The holder and the mass element may also be configured so as to prevent sound from passing through. In such an embodiment, the tactile transducer provides for tactile sensations without an audio signal. It should be further noted that any embodiment herein in which the acoustic and/or audio signal is produced and/or outputted to a user may alternatively be modified to an embodiment herein in which the acoustic and/or audio signal is not produced and/or outputted to the user.

In some embodiments, masses can be attached to the diaphragm via Double adhesive PE or XLPE or other open or closed cell foam. The foam allows sound to escape freely, while lower frequencies produce inertial vibration of the masses. Asymetric arrangement of the mass can create additional modes, and multimass units either in horizontal or vertical arrangement can also be symmetric or asymmetric. An overflow region of PE is desired to allow cushioning for the edges of the mass to reduce damage to the diaphragm. Notably, the use of foam, due to its acoustic qualities, may limit or removed the need of having an opening in the holder or mass element. For example, a foam holder may not require an opening above the center of the diaphragm.

In some embodiments, resonant inertial mass is coupled to the speaker diaphragm via sound pressure. The backside of diaphragm is fully out of phase with the audio that is emanated from speaker. If an air-tight echo chamber is formed, and a resonant mass is attached to a thin vibrating membrane as shown above, the mass can vibrate in resonance to bass (in haptic) frequency and produce tactile effects. Air ports should be provided to allow air movement as the mass is displaced. The entire system can be transported directly to the back of the speaker instead of the lateral arrangement shown above, using the same principles disclosed above.

The acousto-haptic transducer may comprise an echo chamber formed near the diaphragm for enhancing and/or amplifying the haptic signal. The echo chamber may be formed in the region enclosing the diaphragm and an additional semi-rigid diaphragm attached to the voice coil. The acousto-haptic transducer may comprise a rotation assembly for allowing the transducer to rotate and move or pivot freely when placed on the user. Such a rotation assembly may include a ball and socket mechanism. The system may further comprise a controller for splitting an electrical audio signal into a high and low frequency portion and amplifying the low frequency portion. During operation, the amplified low frequency portion of the input audio signal may overlap with the resonant frequency of the transducer and cause it to vibrate while being damped by the full-range speaker's spider.

In some embodiments, a switch (e.g., Switch S) can be either a physical or digital switch, and can turn the gaming vibrator on or off, when it is not desirable to have vibrations when voice communication is being conducted. It can also be automatically activated upon receiving a call. An optional Filter for the low frequencies can be placed for Vibrator feed, either after amplification, or before amplification to separate right and left audio outputs.

In particular, in one aspect, the systems and methods described herein include a transducer capable of generating acoustic and haptic signals. The transducer may comprise a speaker, including a diaphragm, configured to transform an electrical signal having audio information in a first range of frequencies, into an acoustic signal. The transducer may further comprise a mass element attached to the center region of the diaphragm and an echo chamber formed adjacent to the diaphragm. In certain embodiments, the mass of the mass element is selected such that a portion of a resonant frequency range of the combination of the speaker and the mass element falls within the first range of frequencies. The resonant frequency range may be from 50 to 4000 Hz. The mass element may be removably attached to the diaphragm. In certain embodiments, the mass element is glued to the center region of the diaphragm.

The mass element may be formed from a rigid material having a mass in the range of about 1 g to 4 g. The mass element may be formed from copper and may optionally be disk-shaped. In certain embodiments, the ratio of surface area of the top surface of the diaphragm to the surface area of the top surface of the mass element is about 4:1. The transducer may further include a holder attached to the diaphragm for holding the mass element. In certain embodiments, the transducer includes a plurality of mass elements removably stacked on top of each other.

The transducer, and more particularly the speaker may further include a voice coil attached to a diaphragm for receiving the electrical signal and moving the diaphragm in response to the electrical signal, and a spider attached to the voice coil for damping oscillations of the voice coil, the diaphragm and the mass element. In certain embodiments, the diaphragm is substantially rigid and the speaker further comprises a semi-rigid diaphragm. The semi-rigid diaphragm may be attached to the voice coil and the rigid diaphragm, such that the echo chamber is formed in the region enclosed by the semi-rigid diaphragm and the rigid diaphragm. The rigid diaphragm may be cone-shaped and the semirigid diaphragm may be substantially hemispherical shaped.

The speaker may be a full-range speaker. In certain embodiments, the transducer may include a housing having a cap such that the speaker and mass element are disposed within the housing. In such embodiments, the diaphragm is capable of moving up to a maximum height within the housing, and wherein the mass element has a height selected such that when the diaphragm has moved up to the maximum height, the mass element is within the housing and below the cap.

In certain embodiments, the transducer includes comprising a controller connected to a source of the electrical signal and the speaker for splitting the electrical signal and driving the speaker and the mass element with at least one of a signal containing information in the audible frequencies, and a signal containing information in the haptic frequencies. In such embodiments, the controller is configured to amplify the signal containing information in the haptic frequencies.

In another aspect, the systems and methods described herein may include a transducer capable of generating acoustic and tactile signals from an electrical signal having audio information. The transducer may comprise a commercially-available speaker, having a voice coil and a diaphragm disposed within a housing, capable of generating an acoustic signals from electrical signals having audio information within a first range of frequencies. The transducer may also comprise a mass element coupled to at least one of the voice coil and the diaphragm, and an echo chamber formed between the diaphragm and the voice coil. The mass element may be selected such that the transducer has a resonant frequency that falls within the first range of frequencies.

In yet another aspect, the systems and methods described herein may include a system of generating acoustic and tactile signals from an electrical signal having audio information. The system may include a transducer, and a controller. The transducer may include a voice coil, a diaphragm, a spider, a mass element and an echo chamber. The voice coil may be configured to receive an output electrical signal having information within a output range of frequencies. The diaphragm and the spider may be coupled to the voice coil. The mass element may be coupled to at least one of the voice coil and the diaphragm, and having a mass selected such that the resonant frequency of the transducer is within the output range of frequencies. The echo chamber may be formed between the diaphragm and the voice coil. In certain embodiments, the controller may comprise a splitter, an amplifier and a switch. The splitter may be configured for receiving an input electrical signal, and splitting the input electrical signal into at least a first portion having a first range of frequencies and a second portion having a second range of frequencies, wherein the resonant frequency is within the second range of frequencies. The amplifier may be configured for amplifying the second portion. The switch may be connected to the splitter and the amplifier, and configured to receive the first portion, the amplified second portion and a combination of the first portion and the amplified second portion. In yet another aspect, the systems and methods described herein may include a system of generating acoustic and tactile signals from an electrical signal having audio information. The system may include a transducer, and a controller. The transducer may include a voice coil, a diaphragm, a spider, a mass element and a rotation assembly. The voice coil may be configured to receive an output electrical signal having information within a output range of frequencies. The diaphragm and the spider may be coupled to the voice coil. The mass element may be coupled to at least one of the voice coil and the diaphragm, and having a mass selected such that the resonant frequency of the transducer is within the output range of frequencies. The rotation assembly may include ball attached to a portion of the transducer, the ball being configured to fit within the socket. The transducer may be configured to rotate within the socket. In certain embodiments, the controller may comprise a splitter, an amplifier and a switch. The splitter may be configured for receiving an input electrical signal, and splitting the input electrical signal into at least a first portion having a first range of frequencies and a second portion having a second range of frequencies, wherein the resonant frequency is within the second range of frequencies. The amplifier may be configured for amplifying the second portion. The switch may be connected to the splitter and the amplifier, and configured to receive the first portion, the amplified second portion and a combination of the first portion and the amplified second portion.

In still another aspect, the systems and methods described herein may include a method of generating acoustic and tactile signals from an electrical signal having information within a first range of frequencies. The method may comprise providing a transducer having a mass element disposed on a diaphragm of a speaker, wherein, the mass of the mass element is selected such that a portion of a resonant frequency range of the transducer falls within the first range of frequencies. The method may further comprise providing a transducer having an echo chamber formed adjacent the diaphragm. The method further comprises receiving, at the transducer, the electrical signals, and generating, at the transducer, acoustic signals due to the vibration of the diaphragm, and haptic signals due to the resonance of the transducer created by the movement of the mass element at a frequency within the resonant frequency range. The haptic signals may be amplified by the echo chamber. In certain embodiments, the speaker includes a voice coil for receiving the electrical signals, and a spider connected to the voice coil, the method further comprising damping, by the spider, the vibration of the diaphragm and the movement of the mass element.

In another aspect, the systems and methods described herein include a method of manufacturing a transducer capable of generating acoustic and haptic signals from an electrical signal. The method comprises providing an acoustic transducer having a diaphragm, spider and voice coil, and attaching a mass element to the diaphragm. The method further comprises attaching a semi-rigid diaphragm adjacent to the rigid diaphragm to form an echo chamber. In certain embodiments, the mass element includes a rigid metal having a mass selected such that the resonant frequency of the acoustic transducer combined with the mass element falls within a range of frequencies of the electrical signal.

In another aspect, the systems and methods described herein include a method of manufacturing a transducer capable of generating acoustic and haptic signals from an electrical signal. The method comprises providing an acoustic transducer having a diaphragm, spider and voice coil, and attaching a mass element to the diaphragm. The method further comprises attaching a rotation assembly including a socket, and a ball to a portion of the transducer. The ball may be configured to fit within the socket and the transducer may be configured to rotate within the socket. In certain embodiments, the mass element includes a rigid metal having a mass selected such that the resonant frequency of the acoustic transducer combined with the mass element falls within a range of frequencies of the electrical signal.

In another aspect, the systems and methods described herein include a transducer capable of generating acoustic and haptic signals. The transducer may comprise a speaker, including a diaphragm, configured to transform an electrical signal having audio information in a first range of frequencies, into an acoustic signal. The transducer may further comprise a mass element attached to the center region of the diaphragm. The transducer may also include a rotation assembly including a socket, and a ball attached to a portion of the speaker, the ball being configured to fit within the socket. The speaker may be configured to rotate within the socket. In certain embodiments, the mass of the mass element is selected such that a portion of a resonant frequency range of the combination of the speaker and the mass element falls within the first range of frequencies. The resonant frequency range may be from 50 to 4000 Hz. The mass element may be removably attached to the diaphragm. In certain embodiments, the transducer further comprises a sponge block positioned within the socket, such that the ball is positioned on a surface of the sponge block.

In another aspect, the systems and methods described herein include a transducer capable of generating acoustic and haptic signals. The transducer may comprise a speaker, including a diaphragm, configured to transform an electrical signal having audio information in a first range of frequencies, into an acoustic signal. The transducer may comprise a holder attached to a portion of the diaphragm. The holder may include an opening positioned above a center region of the diaphragm. The transducer may further comprise a mass element attached to the holder above the center region of the diaphragm. In certain embodiments, the mass element includes an opening positioned above the opening of the holder, such that at least a portion of the acoustic signal passes from the speaker and through the openings in the mass element and the holder. The transducer may also include a rotation assembly including a socket, and a ball attached to a portion of the speaker, the ball being configured to fit within the socket. The speaker may be configured to rotate within the socket. In certain embodiments, the mass of the mass element is selected such that a portion 5 of a resonant frequency range of the combination of the speaker and the mass element falls within the first range of frequencies. The resonant frequency range may be from 50 to 4000 Hz. The mass element may be removably attached to the diaphragm. In certain embodiments, the transducer further comprises a sponge block positioned within the socket, such that the ball is positioned on a surface of the sponge block.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

The foregoing and other objects and advantages of the invention will be appreciated more fully from the following further description thereof, with reference to the accompanying drawings wherein.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details, or with an equivalent arrangement. In other cases, well-known structures and devices are shown in block diagram form in order to avoid unnecessarily obscuring the embodiments of the invention.

The systems and methods described herein relate to a transducer capable of producing acoustic and tactile stimulation. The transducer includes a mass element disposed on the diaphragm of a speaker. The mass element may optionally be removable and may have a mass selected such that the resonant frequency of the transducer falls within the range of frequencies present in an input electrical audio signal. The mass element may be attached to the diaphragm via a holder. The holder and the mass element may also be configured so as to avoid contact with the center region of the diaphragm and allow for sound to pass through from the center of the speaker. The transducer may include an echo chamber for enhancing the tactile stimulation, and a rotation assembly (e.g., ball and socket mechanism) for improving the fit of the transducer on a user. The systems and methods described herein will now be described with reference to certain illustrative embodiments. However, the present disclosure is not to be limited to these illustrated embodiments which are provided merely for the purpose of describing the systems and methods described herein and are not to be understood as limiting in anyway.

Figure 1A:
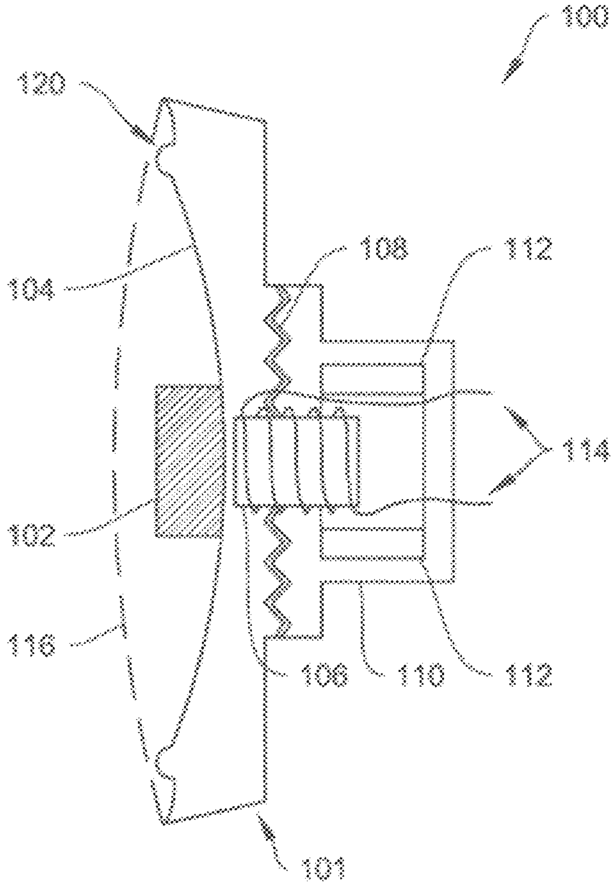
FIGS. 1A and 1B depict side and perspective views of an acousto-haptic transducer, according to an illustrative embodiment of the invention.
Figure 1B:
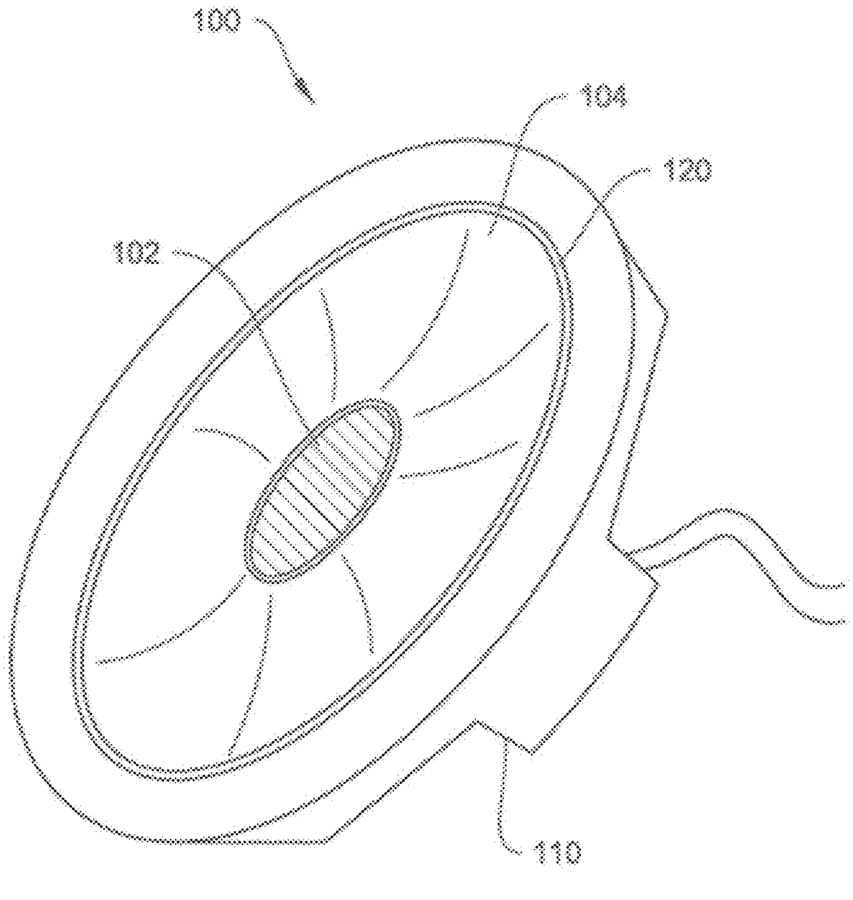

In particular, FIGS. 1A and 1B depict side and perspective views of an acoustohaptic transducer 100, according to an illustrative embodiment of the invention. Transducer 100 includes a mass element 102 coupled to a speaker 101. The speaker 101 may be an acoustic transducer disposed within a housing 110 and includes a voice coil 106 suspended in a magnetic field generated by magnetic assembly 112. The voice coil 106 5 includes a length of wire wound about a core and capable of generating a magnetic field when electric current is passed through leads 114. The voice coil 106 is attached to the housing 110 by a spider 108. The speaker 101 further includes a diaphragm disposed on the voice coil 106 and configured to couple to the housing 110 via flexible rim 120. The diaphragm 104 is capable of vibrating in response to an electrical signal. The diaphragm 104 can be between 0.5 inches and 4 inches in diameter, with a preferred size dependent on the user's size. A thin cushion (not shown) can overlay the diaphragm 104 and be disposed between the diaphragm 104 and the user to soften the impact of the vibrations on the user. The thin cushion may be made of any suitable material that is sufficiently resilient and can provide padding, such as a silicone gel. An external surface of the diaphragm 104 can be any suitable material that is sufficiently tacky to prevent slippage when the external surface rests against skin or fabrics typically used in clothing. Examples of suitable materials include synthetic rubber, polyurethane, fabric used to cover audio speakers, and foam cushion used to cover headphone speakers. The surface material is typically between 1 mm and 5 mm in thickness. A cushion can encircle the transducer 100 to protect the edge of the diaphragm 104.

During operation, an electrical signal (typically broadband oscillating signals) containing at least one of audio and haptic or tactile information may be transmitted to the voice coil 106 through leads 114. The electrical current flowing through the voice coil 106 creates a Lorentz force between the voice coil 106 solenoid and the magnetic assembly 112.

In certain embodiments the magnetic assembly 112 is fixed and attached to the housing 110 and therefore, in response to the Lorentz force, the voice coil 106 may start to oscillate. The spider 108 may damp this oscillation allowing the speaker to have a high fidelity across a full-range of frequencies. The voice coil 106 may serve as an actuator moving the mass element 102 along with the diaphragm. The mass element 102 advantageously allows a user to adjust the resonant frequency of the transducer 100 by varying the mass of the mass element 102. In particular, the transducer may have a resonant frequency range that lies within the range of frequencies of the electrical signal. This resonant frequency range may be moved about the spectrum by adjusting one or more characteristics of the mass element, including its mass. When the voice coil 106 is excited by signals at a frequency in the resonant frequency range, the transducer 100 will vibrate to produce haptic signals. A user can place the transducer 100 in close proximity to skin to perceive tactile sensations generated by these 5 haptic signals.

In certain embodiments, the mass element 102 may be formed from a rigid material having a high density. Alternatively, the mass element 102 may include non-rigid material alone or in combination with rigid material. The non-rigid materials may include, without limitations, silicon. The mass element 102 may be formed from a metal or a metal-alloy. The mass element 102 may be formed from at least one of copper, nickel, silver, gold, manganese, aluminum, and titanium. The mass element 102 may be formed from any suitable rigid material without departing from the scope of the invention. In certain embodiments, the mass element 102 may be formed from a material selected such that the mass, footprint, height, and/or volume of the mass element 102 are suitable for combining with a speaker 101 having a predetermined dimension. In one example, the speaker 101 may be a commercially available speaker having a diaphragm, voice coil and housing with predetermined dimensions. In such an example, the mass element 102 may need to have a particular dimension and shape, and consequently, the mass element 102 may be formed from a material to provide a mass within the constraints imposed by the pre-determined dimensions of the commercially-available speaker. The mass of the mass element 100 may be about 2 g.

In certain embodiments, the mass of the mass element 100 may be from about 0.01 g to about 20 g. In other embodiments, the mass may range from about 1 g to about 4 g. The mass of the mass element may be less than or equal to about 0.1 g, 0.25 g, 0.5 g, 1 g, 1.5 g, 2 g, 2.5 g, 3 g, 3.5 g, 4 g, 4.5 g, 5 g, 10 g, 15 g, or 20 g. In certain embodiments, the mass of the mass element 100 may be selected based on the desired application. For example, for a microspeaker (e.g., microspeakers in mobile devices such as smart phones) having a mass around 1 g-2 g, the mass of the mass element 100 may be selected to be less than 1 g. In certain instances, the mass of the mass element may be selected to be less than 0.1 g.

Generally, as the mass of the mass element 102 increases, the resonant frequency of the transducer decreases. Consequently, the mass of the mass element 102 may be selected to generate haptic signals within particular frequency ranges. In addition to the mass of the mass element 102, the mass of the speaker 101 and housing 110 may be relevant towards the performance of the transducer 100. In particular, the mass of the entire transducer 100 may affect the amplitude of vibrations in the resonant frequency range. Generally, the greater the mass of the transducer 100, the lower the amplitude.

Generally, the mass element 102 may be sized and shaped as suitable for a desired application. The mass element 102 may have a circular cross-section and may be diskshaped, hemispherical, conical, or frusto-conical. The mass element 102 may have a rectangular cross-section and may be cuboidal, or pyramidal shaped. In one embodiment the mass element 102 has a similar shape and dimensions as that of a U.S. 1 cent coin. In particular, the mass element 102 may be disk-shaped and about 0.75 inches (19.05 mm) in diameter and about 0.061 inches (about 1.55 mm) in thickness. Generally, the shape of the mass element 102 may be selected based on the shape of the underlying diaphragm 104 or voice coil 106 or housing 110. The mass element 102 may be selected such that its footprint (cross section area) is small enough so as not to affect the acoustic characteristics of the diaphragm. Generally, the larger the footprint of the mass element 102, the lower the amplitude of the sound produced by the transducer 100. Therefore, it may be desirable to have a mass element 102 with a footprint small enough so that the diaphragm 104 can produce audible sound. In one embodiment, the ratio between the diaphragm 104 and the cross-section surface area of the mass element 102 may be about four.

In certain embodiments, transducer 100 may include an optional and removable dust cap 116. In such embodiments, the dimensions of the mass element 102 may be selected such that during operation (when the mass element 102 moves towards and away from the 25 cap 116) the mass element 102 does not make contact with the cap 116. In such embodiments, the haptic signals are transmitted to the user through inertial vibration of the housing 110 of the transducer. In certain embodiments, the transducer may be configured to provide an alarm signal to a user when the transducer is malfunctioning or is being incorrectly or inappropriately used. The mass element 102 may be configured to make contact with the cap 116 during operation. In such an embodiment, a user may place the cap 116 in contact with skin and may feel the mass striking the inside of the cap 116 during use. Such haptic signals may be stronger than other signals and consequently may signal an alarm to the user.

The mass element 102 may be disposed near the center region of the diaphragm 104. The mass element may be attached away from the center region on the diaphragm 104. In certain embodiments, transducer 100 includes a plurality of mass elements 102, having the same or different masses sizes and shapes, stacked on top of each other at one or more locations on the diaphragm 104. In one such embodiment, the transducer 100 includes a plurality of mass elements 102 located at a two or more locations on the diaphragm 104. In such an embodiment, the transducer 100 may have more than one adjustable resonant frequency range, and when vibrated at one or more of these frequencies, the transducer 100 may generate haptic signals. In certain embodiments, a plurality of mass elements 102 having different masses, based on their location on the diaphragm 104, may be capable of transverse vibrations in addition to longitudinal vibrations. In such embodiments, a user may selectively control which of the plurality of mass elements 102 to resonate.

In certain embodiments, the mass element 102 may be attached to the diaphragm 104 using an adhesive such as glue. In certain embodiments, the diaphragm 104 may have an opening in the center region. In such embodiments, the mass element 102 may be attached to the voice coil 106 and/or a portion of the diaphragm 104 surrounding the opening. In certain embodiments, the mass element 102 may be permanently attached to the diaphragm 104 and/or voice coil 106. In certain other embodiments, the mass element 102 may be removably attached or removably coupled to the diaphragm 104 and/or voice coil 106. In such embodiments, the mass element 102 may be attached to the diaphragm 104 and/or voice coil 106 by a temporary or removable adhesive. In other embodiments, the mass element 102 may be attached to one or more portions of the housing 110. In such embodiments, the mass element 102 may be attached to an inside or outside portion of the housing. In one embodiment, the mass element includes one or more components associated with the housing 110. For example, if a diaphragm 104 is directly connected to (e.g., glued) to the frame of a housing module, the magnet and/or the frame of the speaker may act as the resonant mass. Thus, various components of a transducer system may be configured, shaped, connected, weighted, and/or arranged in a selected way as to provide a resonant mass for the transducer system.

Figure 2A:
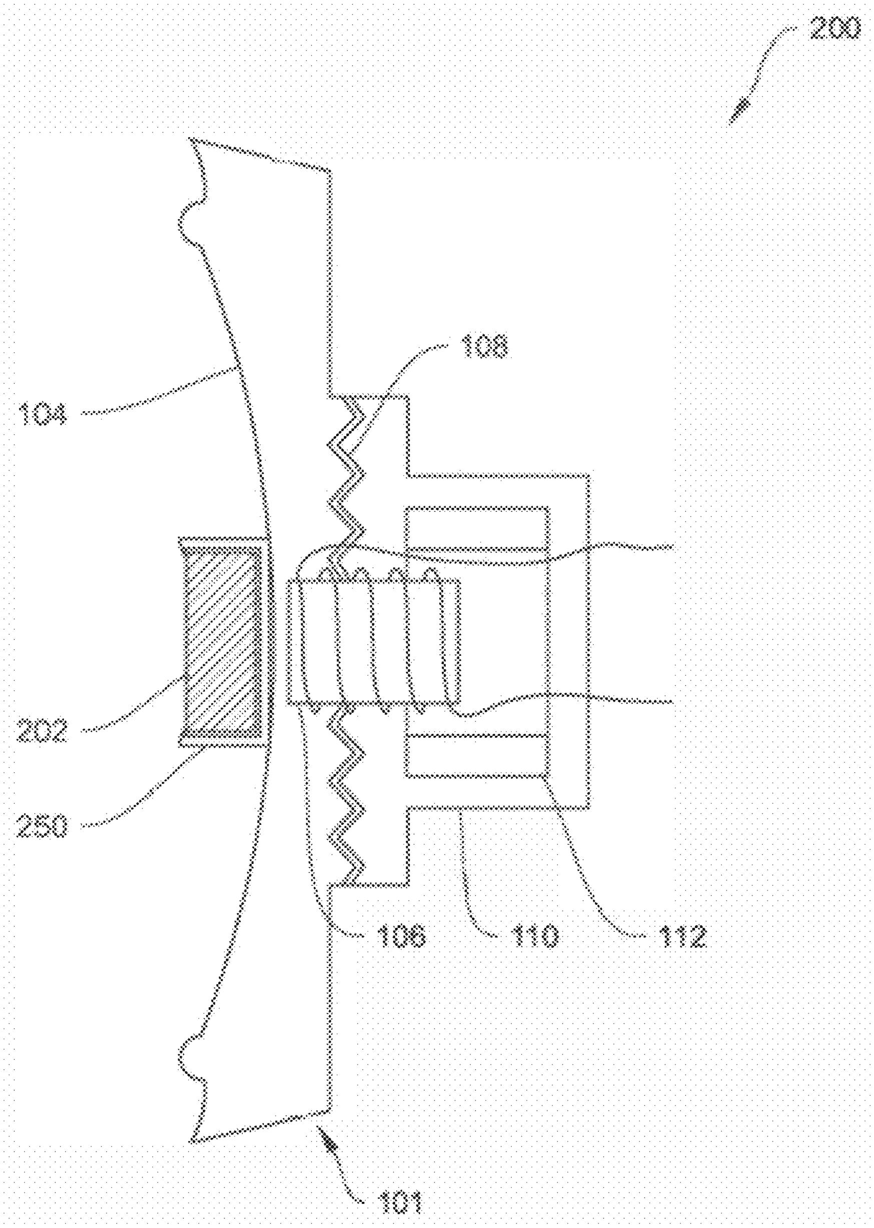
FIG. 2A depicts a side view of an acousto-haptic transducer, according to an illustrative embodiment of the invention.

FIGS. 2A-2F depict various illustrative embodiments of an acousto-haptic transducer as described herein. Features in each of the FIGS. 2A-2F and FIGS. 1A-1B may be combined, modified and substituted in any suitable configuration without departing from the scope of the present disclosure. For example, features shown or described with reference to one or more of FIGS. 1A-2F may be combined with 5 features shown or described with reference to another one or more of FIGS. 1A-2F without departing from the scope of the present disclosure. In certain embodiments, as depicted in FIG. 2A, mass element 102 may be coupled, indirectly, to the diaphragm 104 and/or voice coil 106 via a holder 250. In particular, FIG. 2A depicts a side view of an acousto-haptic transducer 200, according to an illustrative embodiment of the invention. Transducer 200 may be similar to transducer 100 of FIG. 1 in many respects, however, mass element 200 (which may be similar to mass element 100) is removably coupled to the speaker 101 using a holder 250. The mass element 200 may be snapped into the holder 250 to allow the transducer 200 to suitably operate as a haptic transducer. As desired, haptic functionality may be reduced by snapping off mass element 200 from its holder 250. The holder 250 may be formed from any suitable material, and sized and shaped as desired without departing from the scope of the invention. In certain embodiments, the holder 250 may be configured to hold a plurality of mass elements 102.

Transducers 100 and 200 may be configured with a plurality of mass elements 100 or 200. A user may advantageously add or remove one or more mass elements 100 or 200 to adjust and modify the resonant frequency range of the transducer. In certain embodiments, the mass elements 100 or 200 may be stacked on top of each other and attached together by adhesive. In other embodiments, the mass elements 100 or 200 may be stacked together and snapped onto holder 250. Each of the plurality of mass elements 100 or 200 may have the same or different dimensions, shape, density, mass, material and other characteristics.

Generally, the speakers 101 may be any audio producing device. For example, the audio speakers 101 can be any suitable audio device, such as a loudspeaker, tweeter, subwoofer, earphone, headphone, or neckphone, and the like. The speaker 101 and the mass element 102 are enclosed within housing 110. The housing 110 may encase the speaker 101, mass element 102 and/or other processing circuitry, as will be described in more detail below with reference to FIGS. 3-9. The housing 110 may be configured to support user control interfaces such as a button, switch, dial or screen. The housing 110 may be adapted to attach (directly or indirectly) at least by wire leads 114 to any suitable data source of audio or haptic data, such as a portable music device or video game console. In another alternative embodiment, housing can include, an on-board power source, and a wireless receiver, a wireless transceiver, and a wireless transmitter for communicating audio or haptic data.

Figure 2B:
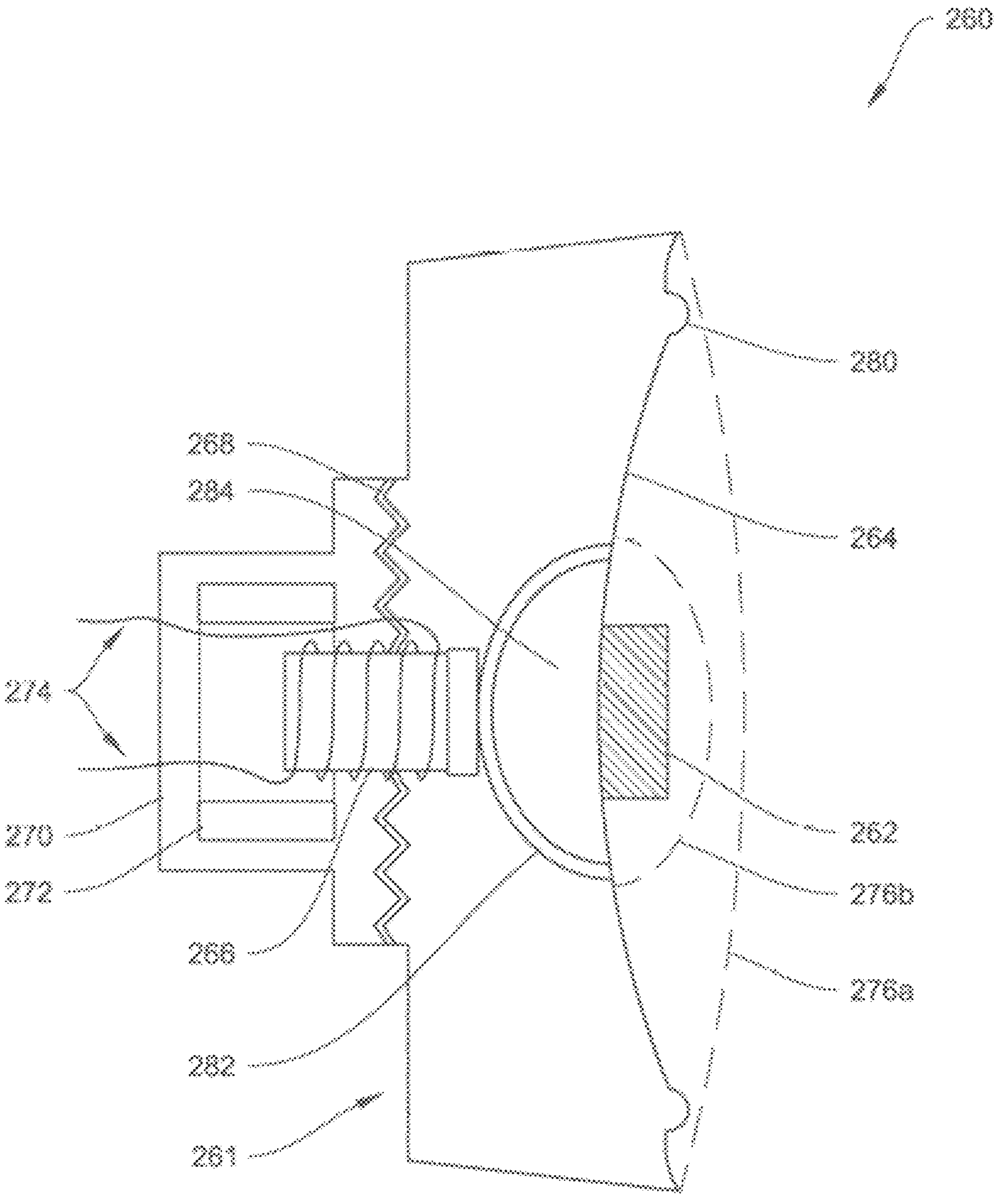
FIGS. 2B and 2C depict a side view of an acousto-haptic transducer having an echo chamber, according to an illustrative embodiment of the invention.
Figure 2C:
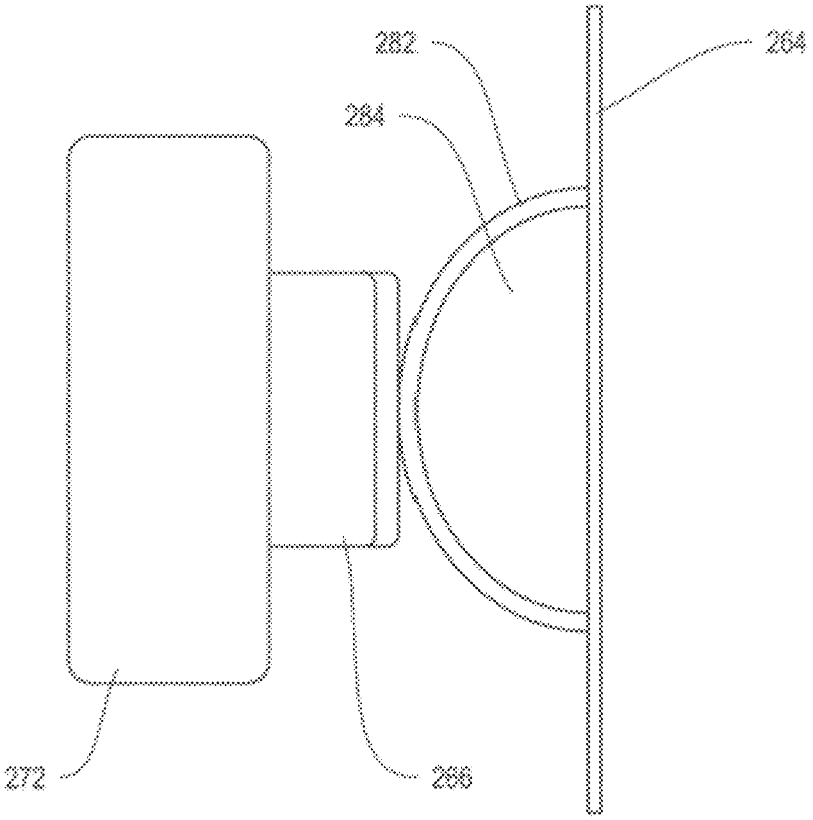

In certain embodiments, to help increase the efficiency and performance, the acoustohaptic transducer described herein may be configured to amplify the output of haptic frequencies. In such embodiments, the acousto-haptic transducer may include one or more echo mediums or echo chambers for generating reverberations or echos and thereby enhance the output of the haptic signal. FIGS. 2B and 2C depict a side view of an acousto-haptic transducer having such an echo chamber, according to an illustrative embodiment of the invention. In particular, transducer 260 includes a mass element 262 coupled to a speaker 261. The speaker 261 may be an acoustic transducer disposed within a housing 270 and includes a voice coil 266 suspended in a magnetic field generated by magnetic assembly 272. The voice coil 266 includes a length of wire wound about a core and capable of generating a magnetic field when electric current is passed through leads 274. The voice coil 266 is attached to the housing 270 by a spider 268. The speaker 261 further includes a diaphragm disposed on the voice coil 266 and configured to couple to the housing 270 via flexible rim 280. The diaphragm 264 is capable of vibrating in response to an electrical signal. The diaphragm 264 can be between 0.5 inches and 4 inches in diameter, with a preferred size dependent on the user's size. A thin cushion (not shown) can overlay the diaphragm 264 and be disposed between the diaphragm 264 and the user to soften the impact of the vibrations on the user. The thin cushion may be made of any suitable material that is sufficiently resilient and can provide padding, such as a silicone gel. An external surface of the diaphragm 264 can be any suitable material that is sufficiently tacky to prevent slippage when the external surface rests against skin or fabrics typically used in clothing. Examples of suitable materials include synthetic rubber, polyurethane, fabric used to cover audio speakers, and foam cushion used to cover headphone speakers. The surface material is typically between 1 mm and 5 mm in thickness. A cushion can encircle the transducer 260 to protect the edge of the diaphragm 264.

As shown in FIG. 2B and in a simplified depiction of transducer 260 in FIG. 2C, the diaphragm 264 may be a substantially rigid surface. The rigid diaphragm 264 may be any suitable material that is substantially rigid, to prevent uncontrolled cone motions, have relatively low mass, to minimize starting force requirements and energy storage issues, and be well damped, to reduce vibrations continuing after the signal has stopped 5 with little or no audible ringing due to its resonance frequency as determined by its usage. In certain embodiments, the substantially rigid diaphragm 264 may be formed from at least one of metal, plastic or a suitable composite material such as composite paper infused with carbon fiber, Kevlar, glass, hemp or bamboo fibers. The substantially rigid diaphragm 264 may be configured in a honeycomb sandwich construction, and may include an additional coating to provide additional stiffening or damping. The diaphragm 264 may have a cone- or domeshaped profile, and may be any suitable size as desired without departing from the scope of the present disclosure. The substantially rigid diaphragm 264 may be attached to the voice coil 266 through a semi-rigid diaphragm 282.

The semi-rigid diaphragm 282 may be formed from semi-rigid materials including at least one of cellulose fiber (paper), cellulose fiber (paper) with synthetic fibers and binders, and silk. In certain embodiments, the semi-rigid diaphragm 282 may be shaped and positioned such that an echo chamber or echo medium 284 is created between the semi-rigid diaphragm 282 and the rigid diaphragm 264. During operation, in response to electrical signals passing through the voice coil 266, the semi-rigid diaphragm 282 and the rigid diaphragm 264 may vibrate to produce haptic signals. Such haptic signals may reverberate within the echo chamber 284 and thereby amplifying the strength of the output signal. The semi-rigid diaphragm 282 may be shaped, sized and have a suitable curvature as necessary depending on the desired sound characteristics. The size of the echo chamber 284 may be selected as necessary depending on the desired sound characteristics.

Figure 2D:
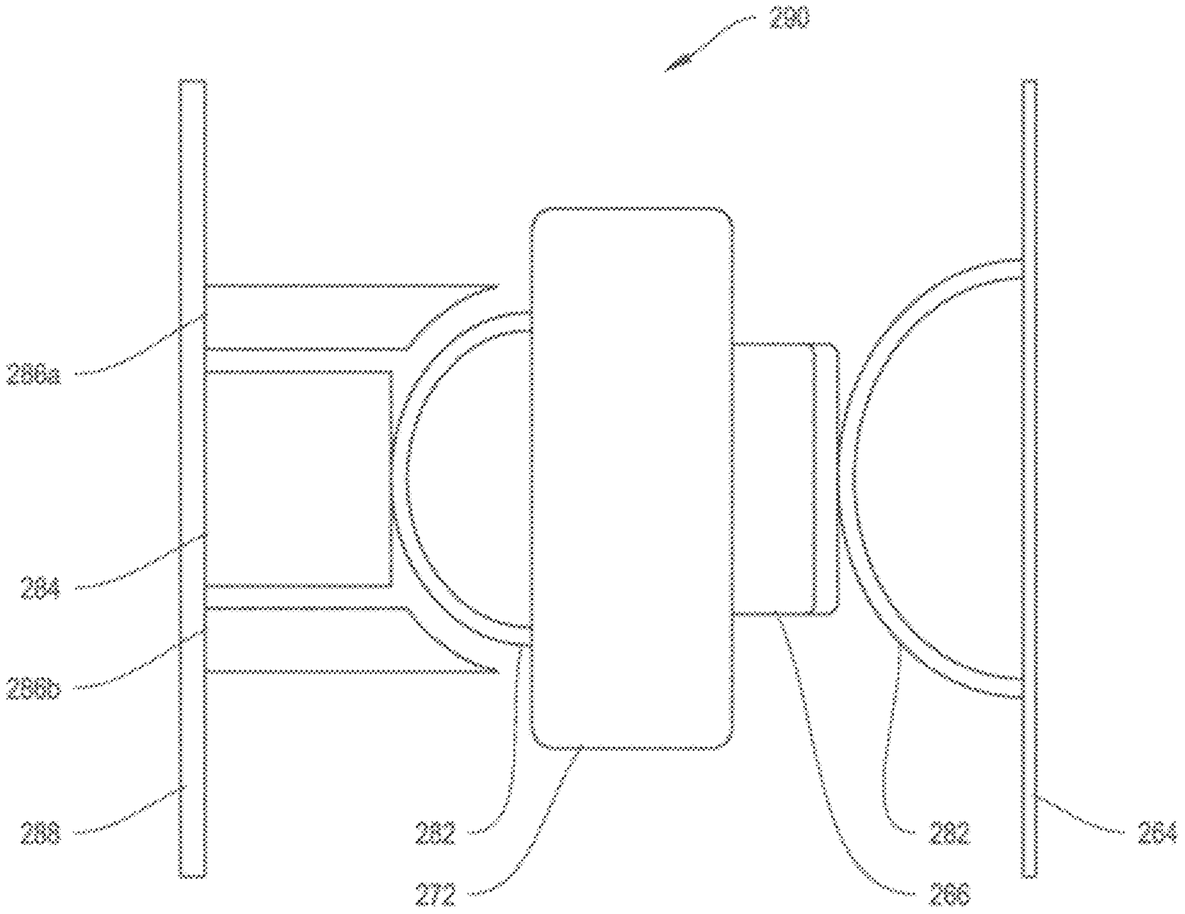
FIG. 2D depicts a side view of an acousto-haptic transducer having an echo chamber and a mechanism to allow for an improved fit to the body of the user, according to an illustrative embodiment of the invention.

In certain embodiments, the echo chamber 284 helps amplifying the output of haptic frequencies because it functions as a low frequency resonator. In certain alternative embodiments, the acousto-haptic transducer described herein may include one or more other low frequency resonating structions, alone or in combination with the echo chamber 284. For example, the acousto-haptic transducer described herein may include one or more springs having a similar natural frequency. These one or more springs may have any suitable shape, including but not limited to, conical, constant pitch, hourglass, variable pitch, and barrel shaped, and these one or more springs may be formed from round or rectangular wire as desired without departing from the scope of the present disclosure. The one or more springs may be formed from any suitable material including at least one of metal and plastic. The acousto-haptic transducer described herein may include any suitable low frequency resonator without departing from the scope of the present disclosure. In certain embodiments of the systems and methods described herein, it may be desirable to improve the fit of the acousto-haptic transducer to a user. FIG. 2D depicts a simplified side view of an acousto-haptic transducer having an echo chamber and a mechanism to allow for an improved fit to the body of the user, according to an illustrative embodiment of the invention. In particular, transducer 290 of FIG. 2D is similar to transducer 260 of FIGS. 2B and 2C with the addition of an exemplary rotation assembly mechanism to allow for rotation and/or movement of the transducer about a body of a user. Transducer 290 includes a ball and socket mechanism including a ball 282, and a socket assembly 286 (shown in cross section FIG. 2D as partial sockets 286*a* and 286*b*). The ball 282 is attached to the transducer (such as transducer 286) and during operation, the transducer with the ball 282 may rotate freely about and within socket assembly 286. Although, the ball 282 is shown as being attached to the magnet 272 in the simplified FIG. 2D, it should be understood that the ball 282 may be attached to any portion of the transducer including, among others, housing 270 without departing from the scope of the present disclosure.

Generally, the ball and socket mechanism may be formed form any suitable rigid material as desired without departing from the scope of the present disclosure. The ball 282 is depicted as a hemispherical structure, however, the ball 282 may be any suitable portion of a spherical structure or any suitable shape. The socket 286 may be sized and shaped to accommodate the ball 282. In certain embodiments, the rotation assembly including the ball and socket further includes a sponge block 284, which may be formed from foam-like material, disposed within the socket and provides a landing for the ball 282. In particular, the ball 282 may be disposed within the socket 286 such that the ball 282 is in contact with the sponge block 284. The sponge block 284 may allow for the free movement of the ball 282 within the socket 286. The rotation assembly may further include a rigid plane 288 for supporting the ball 282, socket 286 and/or sponge block 284. Generally, the rotation assembly may include any suitable mechanism alone or in combination with the ball and socket mechanism. For example, the rotation assembly may include a gimbal assembly having one, two or three degrees of freedom along one, two or three axes. Any suitable rotation assembly may be included without departing from the scope of the present disclosure.

Figure 2E:
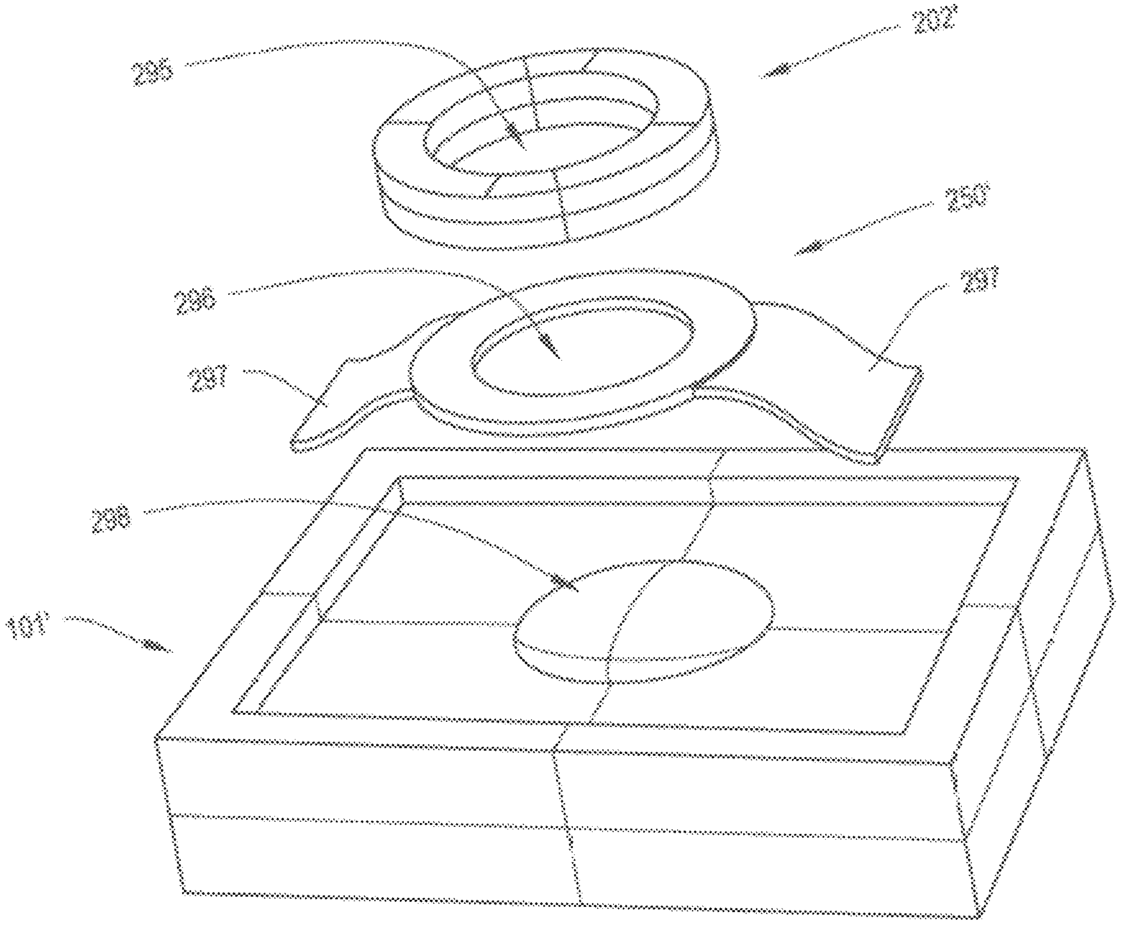
FIGS. 2E and 2F depict perspective views, exploded and assembled, respectively, of an acousto-haptic transducer, according to an illustrative embodiment of the invention.
Figure 2F:
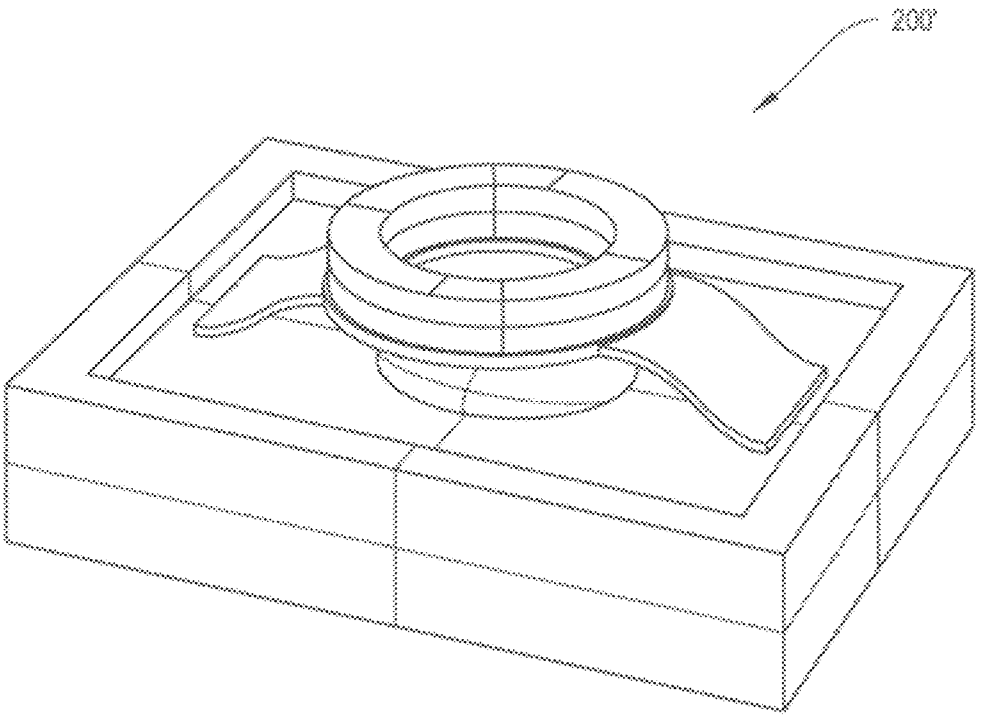

In certain embodiments, the mass element described herein may be coupled indirectly to a portion of the speaker. For example, as was depicted and described herein with reference to FIG. 2A, the mass element may be coupled to a diaphragm and/or voice coil via a holder. Such embodiments may be desirable when, among other times, fitting a commercially available speaker or microspeaker with a mass element to turn the speaker or microspeaker into an acousto-haptic transducer as described herein. When coupled to the speaker, it may be desirable for the mass element to not dampen the audible frequencies of the speaker. FIGS. 2E and 2F depict perspective views, exploded and assembled, respectively, of an acoustohaptic transducer 200 having a mass element sized, shaped and positioned on a speaker to limit dampening of the audible frequencies, according to an illustrative embodiment of the invention. In particular, FIGS. 2E and 2F show a simplified depiction of a speaker 101, which may be similar to speaker 101 of FIGS. 1A and 1B. Speaker 101 may include a commercially available speaker or microspeaker and may include a diaphragm disposed over a voice coil. Transducer 200 includes a mass element 202 and a holder 250. The mass element 202 and the holder 250 are carefully selected to not dampen, or at least substantially limit dampening the audible frequencies generated by the speaker 101. Specifically, Applicants have recognized that such dampening can be reduced by limiting or eliminating the contact of the mass element 202 and/or holder 250 with a central region 298 of the speaker 101. Lower frequencies, generally responsible for the haptic signals generated by transducer 200, may be in the range of about 0 to about 500 Hz. These haptic signals are typically generated by the excursion of the entire or a substantial portion of the diaphragm. Therefore, it may be sufficient to attach the mass element 202 to the periphery of the central region 298 of the speaker 101.

As depicted in FIGS. 2E and 2F, the mass element 202 is attached to speaker 101 via holder 250. To minimize the footprint of the mass element 202 and the holder 250 on the central region 298, the holder 250 includes legs 297 that are permanently or removably attached outside of the central region 298. The legs 297 may be attached to the diaphragm in any suitable manner including, among others, by gluing with adhesive. The legs 297 are depicted as having an s-shaped profile to accommodate the mass element 202 and to attach to the diaphragm. The legs 297 may be shaped such that only a portion of the end tip regions of the legs 297 may be attached to the diaphragm of the speaker 101. To prevent damage to the diaphragm, the tips or ends or edges of the legs 297 may be rounded. The holder 250 includes a central ring shaped region to accommodate the mass element 202. The holder 250 may be formed from any suitable material sufficient to support the mass element 202 above the central region 298 during vibration of speaker 101. In certain embodiments, the holder 250' may be formed from a thin suspension film membrane such as a polyester membrane including, but not limited, to polyethylene terephthalate (PET), biaxially-oriented polyethylene terephthalate (BoPET), polypropylene (PP) and biaxially-oriented polypropylenc (BoPP). The holder 250 may be formed from any material having properties similar to those of PET, BoPET, BoPP, PP, without departing from the scope of the present disclosure. The holder 250 may have a thickness similar to or smaller than the thickness of the diaphragm of speaker 101. In certain embodiments, the thickness of the holder 250 may be larger than the thickness of the diaphragm of speaker 101. Generally, the holder 250 may be sized and shaped as desired to allow for stable anchoring of the mass element 202 on the diaphragm, while preventing the mass from making contact with the diaphragm of speaker 101 during vibration.

The mass element 202 may be similar to the mass elements described with reference to FIGS. 1A-2D and serves to convert the speaker 101 to an acousto-haptic transducer 200. As shown in FIGS. 2E-2F, the mass element 202 is a toroidal shaped structure having an opening 295 positioned on top of the holder 250. The holder 250 also includes an opening 296 substantially concentric with the opening 295 of the mass element 202. The toroidal shape allows sound to pass through to a user from the central region 298 of the 30 speaker 101. Thus, the openings 295 and 296 serve to reduce dampening of acoustic signals in the acousto-haptic transducer. The mass element 202 and the opening 295 may be any suitable shape or size without departing from the scope of the present disclosure. Moreover, the mass element 202 and the holder 250 may or may not have the same shape. The mass element 202 may be larger than or smaller than the holder 250, and the opening 295 may be larger than or smaller than the opening 296. In certain embodiments, the opening 296 may not be concentric with the opening 295, and the mass element 202 may be not positioned centrally with reference to holder 250. In one example (not shown in the figures), the mass element 202 may have a rectangular shape, but the opening 295 may be circular. In certain embodiments, acousto-haptic transducer 200 may have a mass of about 1.107 g, wherein the mass of the mass element 202 may be less than 0.1 g and approximately 0.086 g. In such embodiments, the holder 250 may be formed from BoPET and have a thickness of about 0.04 mm.

As noted earlier, during operation electrical signals from a data source cause the transducer 100, 200, 260 and/or 290 to generate acoustic and haptic signals. In certain embodiments, a controller and/or other processing circuitry may be disposed between the data source and the transducer 100, 200, 260 and/or 290 to enhance the signal.

Figure 3:
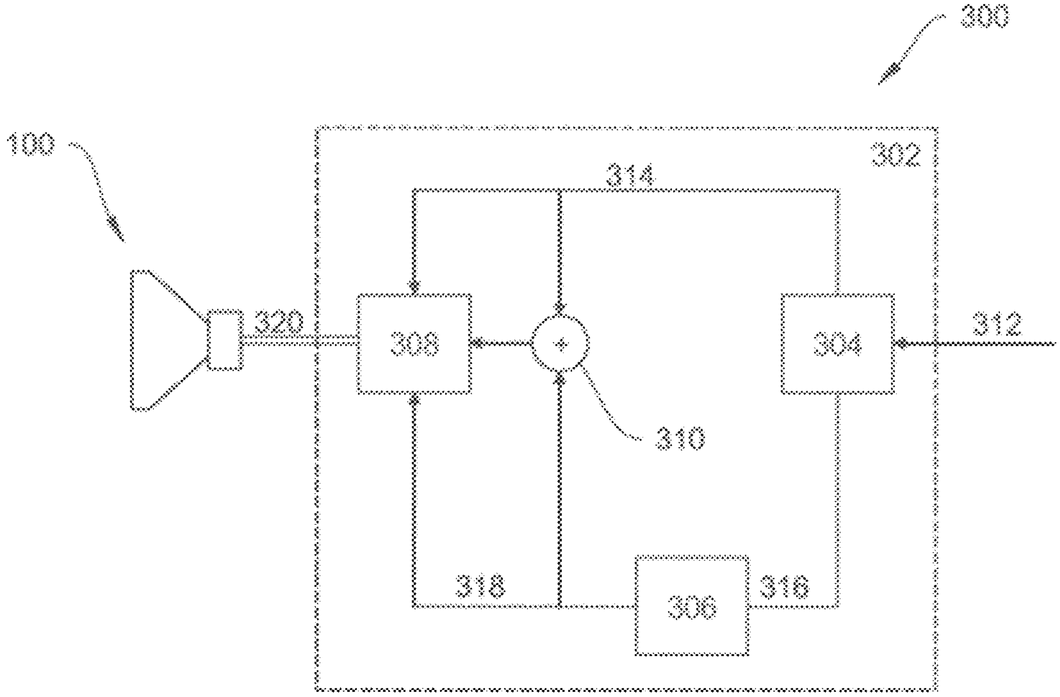
FIG. 3 is a block diagram of an acousto-haptic transducer coupled to a controller, according to an illustrative embodiment of the invention.

FIG. 3 is a block diagram of an acousto-haptic transducer coupled to a controller, according to an illustrative embodiment of the invention. In particular, FIG. 3 shows a system 300 including an acousto-haptic transducer 100, 200, 260 or 290 connected to a controller 302. Electrical signals containing audio and/or haptic signals 312 are fed into the controller 302, and specifically into filter 304. Splitter 304 splits the signal 312 into a first portion 314 having a first range of frequencies and a second portion 316 having a second range of frequencies. Often times, haptic information may be contained in the low frequency region of an incoming audio signal 312. The splitter 304 may include a combination of one or more high-pass, low-pass, band-pass filters to split the signal 312 into a high frequency portion corresponding to first portion 314, and a low frequency portion corresponding to second portion 316. The second portion 316 is amplified at amplifier 306 to produce an amplified signal 318. Below is a more detailed description of amplifying or enhancing the low frequency or bass portion of the signal (bass enhancement).

The controller 300 may include a switch 308 for controlling the nature of the signal 320 being sent to the transducer 100, 200, 260 and/or 290. In certain embodiments, the switch 308 includes a 3-way switch. In such embodiments, in a first mode, the switch 308 may be configured to transmit to the transducer 100 the first portion 314. In a second mode, the switch 308 may be configured to transmit to the transducer 100, 200, 200' 260 and/or 290 the amplified second portion 318. In a third configuration, the switch 308 in connection with other processing circuitry 310, e.g., a summing circuit, amplifier, transistor, operational amplifier, or like signal combiner, may be configured to transmit a combination of both portions 314 and 318. The switch 308 may be mechanical, electromechanical, micromachined, MEMS-based, integrated circuit (IC) based, hardware and/or software based.

Any of the components 304, 306, or 308 may include a microprocessor for controlling the operation of any of the components 304, 306, or 308. In one embodiment, the microprocessor is included in a separate IC and controls some or all of the components in the controller 302. The microprocessor may include or interface with a memory configured to store instructions of a software program, function, and/or application. A function or application may be configured to control one or more of the components 304, 306, 308, or other components based on the instructions stored in the memory, e.g., a computer readable medium. For example, the application may dynamically control the switching of the switch 308 based on a detected signal 312, 314, and/or 316. The application may, for example, control the splitter 306 or filter 304 to set the frequency and/or bandwidth for filtering or splitting. The microprocessor may include a digital signal processor (DSP), running microcode or the like, to perform certain functions. Any of the various illustrative systems disclosed herein may include a microprocessor controller as described above. In some embodiments, any of the signals, at any stage of signal processing, may be converted and processed as digital signals, and then converted to an analog signal for driving the output audio and/or haptic signals.

The switch 308 and processing circuitry 310 arrangement are one example of how signals may be combined and/or separately provided to the speaker 100, 200, 200' 260 and/or 290 or a driver circuit. Other arrangements may be employed. For example, a set of switches may be used to block or pass any one of the signals to the speaker 100, 200, 200', 260 and/or 290. An amplifier may be used to combine the signals 314 and 318 while a switch is enabled or disabled to pass the combined signal to the speaker 100, 200, 200', 260 and/or 290 or a driver circuit or other component. Those of ordinary skill will understand that various other arrangements may be employed to effect the combining and/or selection of various signals.

In certain embodiments, the incoming electrical audio signal 312 may be a stereo signal configured to be processed and transformed to sound by a plurality of transducers.

Figure 4:
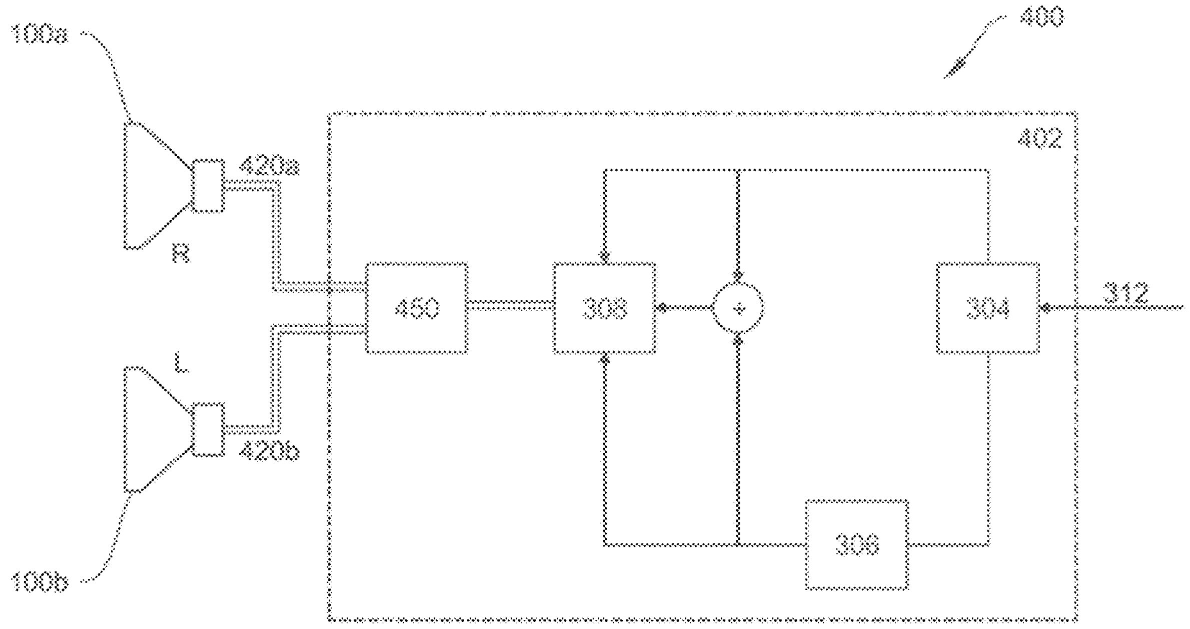
FIG. 4 is a block diagram of two acousto-haptic transducers coupled to a controller, according to an illustrative embodiment 5 of the invention.

FIG. 4 is a block diagram of two acousto-haptic transducers coupled to a controller for processing stereo sound and haptics, according to an illustrative embodiment of the invention.

In particular, FIG. 4 shows a system 400 including two acousto-haptic transducer 5 100*a* and 100*b* (each similar to transducers 100, 200, 200' 260 and/or 290) connected to a controller 402. Incoming electrical signals 312 are split into two portions similar to controller 302 of FIG. 3. One portion of the signal 312 corresponding to the haptic portion may be amplified and optionally recombined with the audio portion. Controller 402 further includes processing circuitry 450 for separately driving the left transducer 100*a* and right transducer 100*b*.

Acousto-haptic systems 300 and 400 described above may receive electrical signals containing audio, haptic, and other data from a variety of media and devices. Example media include music, movies, television programs, video games, and virtual reality environments. Example devices that can provide data and be used in conjunction with a vibration device include portable music players, portable video players, portable video game consoles, televisions, computers, and home entertainment systems. Exemplary acousto-haptic systems may connect to exemplary devices via an audio jack coupled to a wire or may contain a wireless receiver for wirelessly receiving signals from a device equipped with a wireless transmitter.

Using a acousto-haptic device in conjunction with a media device can enhance the user's interaction with the media by creating tactile sensations that synchronize with the data being presented by the media device. For example, soundtracks that accompany movies typically have, in addition to music and dialogue, sounds that accompany the action in the movie, such as a door slamming or an explosion. The acousto-haptic device, by transforming these sounds into vibrations, allows the user to simultaneously feel this action in addition to seeing and hearing it, which can create a more immersive experience for the user. This immersive effect can be especially desirable when the visual data is poor, for example portable devices with small video screens or computer monitors with relatively low resolution. As another example, the user's perception of music may be enhanced by the vibration device, which can create a tactile sensation synchronized with the music by using the same data source as the audio speakers. This enhancement can be especially desirable for experiencing the low frequency component, also known as bass.

As noted above the acousto-haptic systems 300 and 400 can include processing circuitry capable of processing electrical signals for enhancing the content perceived by the user or allowing the user to modify the content. Exemplary functions of processing circuitry include selecting acoustic and/or haptic signal portions, pitch control, volume control, fade in, amplitude-ceiling, auto shut-off, channel separation, phase-delay, and bass enhancement, whose implementations are well-known to one skilled in the art. Pitch control allows a user to increase or decrease the overall frequency of an electrical signal. Volume control allows a user to increase or decrease the overall amplitude of an electrical signal. Fade-in gradually increases the amplitude of the beginning of an electrical signal to lessen the initial impact of vibrations on a user. Amplitude-ceiling creates an upper bound on the magnitude of the amplitude of the electrical signal to prevent the user from experiencing excessively intense vibrations. Auto shut-off turns off the processing circuitry to conserve power without receiving input from the user and when an electrical signal has not been received for a preset amount of time. Channel separation separates a stereo or multichannel signal into its component channels. Phase-delay delays a signal sent to a second vibrator with respect to a signal sent to a first transducer to give the user the impression the sound originated from a location closer to the first transducer than the second transducer. Bass enhancement increases the amplitude of the bass component of an electrical audio signal relative to the rest of the signal.

Examples of multichannel signals that can be separated by processing circuitry include stereo sound, surround sound, and multichannel haptic data. Stereo sound typically uses two channels. Channel separation circuitry can separate a stereo sound two-channel electrical audio signal into a left channel signal and a right channel signal intended to be experienced by the user from, respectively, a left-hand side and a right-hand side. Multichannel electrical audio signals, such as those used in 5.1 and 6.1 surround sound, can similarly be separated, and typically contain rear channel signals intended to be experienced by the user from the rear. Channel separation circuitry can also separate multichannel haptic data, such as those used with video games or virtual reality environments, that similarly contain data intended to be experienced by the user from a specific direction.

Multiple implementations of bass enhancement are possible. In one implementation, an electrical signal is received at an input for transmitting to a transducer and/or audio speakers. A low frequency cross-over circuit can filter through only the bass component of the received electrical signal, whose overall amplitude is increased by an amplifier before reaching a transducer.

Another bass enhancement implementation increases the bass component without filtering out the rest of a signal. Processing circuitry can sample a received electrical signal to create a sampled signal, modulate the pitch of the sampled signal to create a modulated sampled signal, and mix the modulated sampled signal with the received electrical signal to create a signal for the transducer. The modulation of the pitch preferably lowers the pitch of the sampled signal to increase the bass component of the signal received by the transducer. The user may also control the degree of bass enhancement by lowering the overall frequency of a signal using pitch control.

Figure 5:
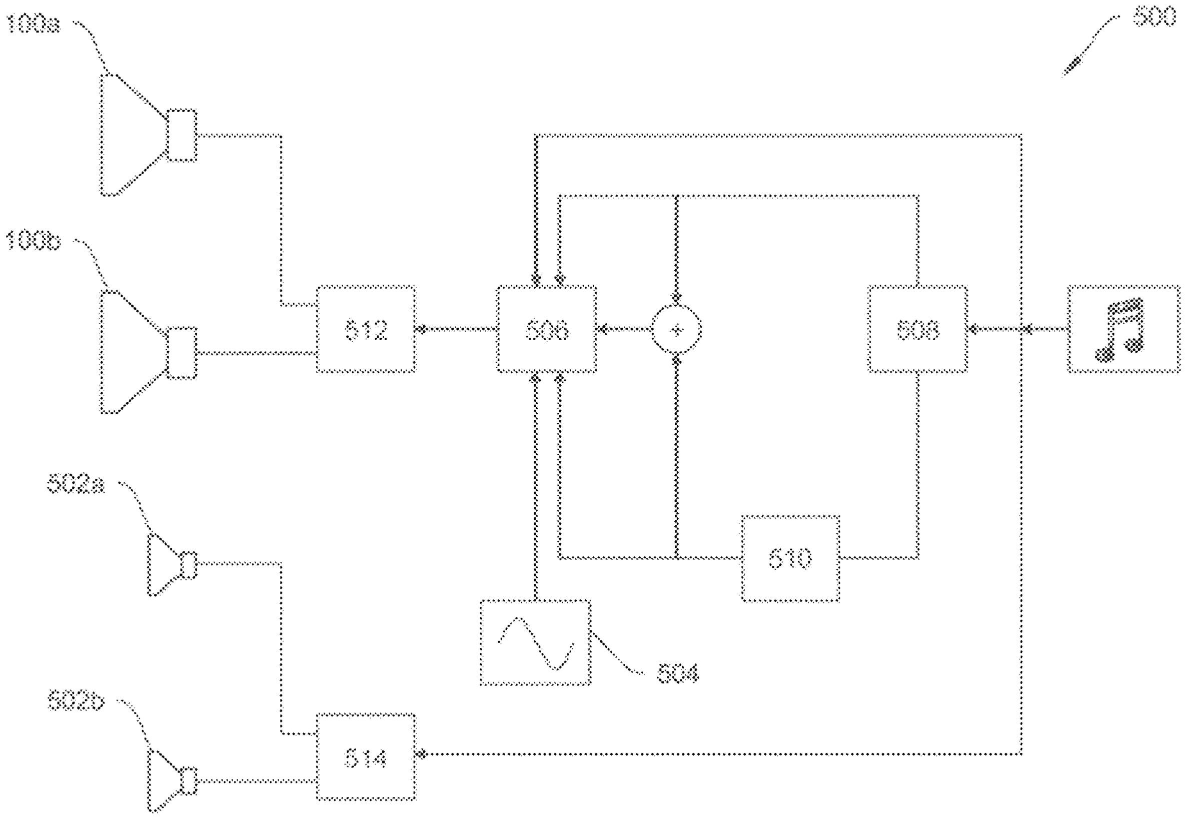
FIG. 5 is a block diagram of two acousto-haptic transducers and two speakers coupled to a controller, according to an illustrative embodiment of the invention.
Figure 6:
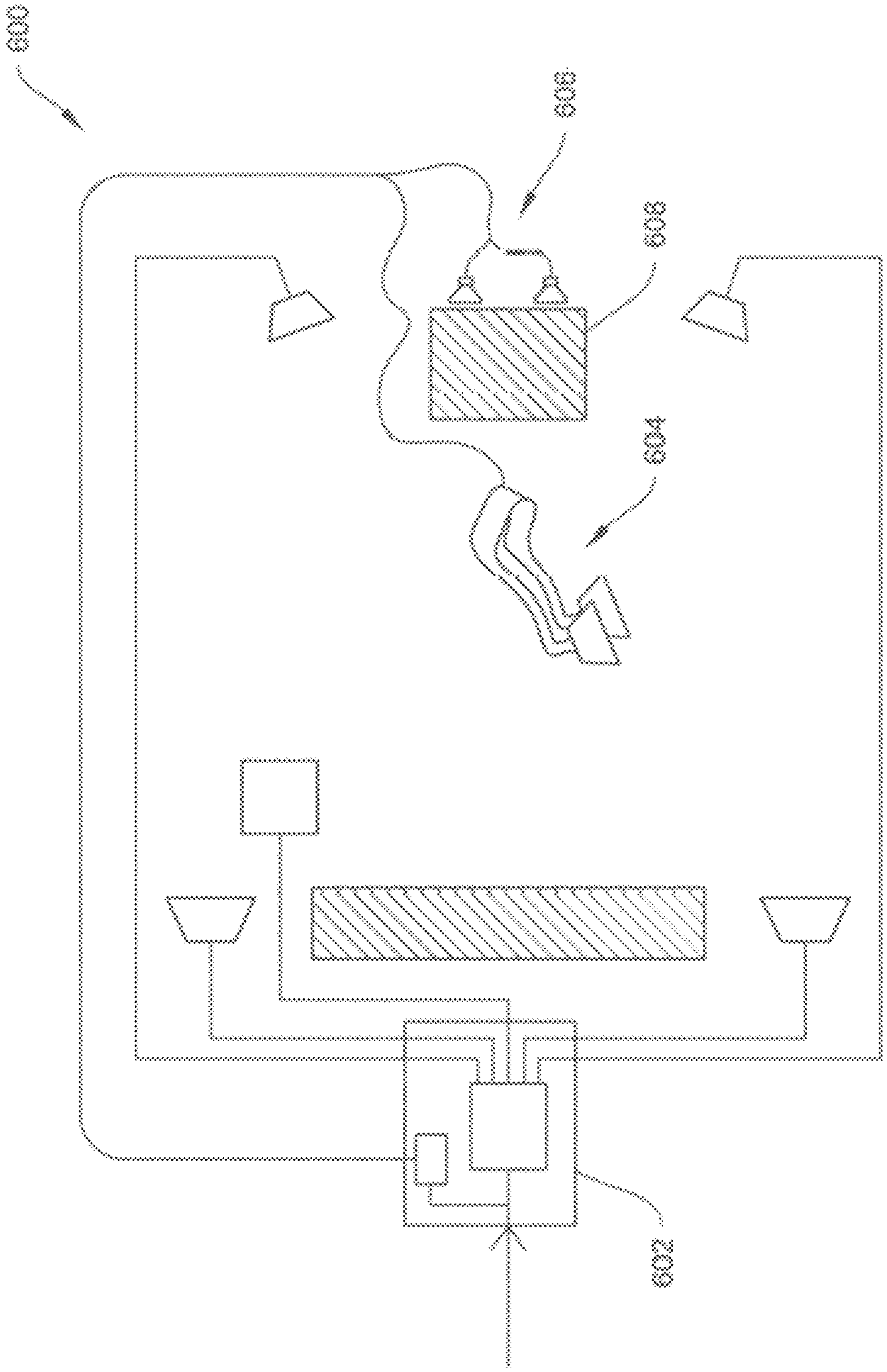
FIG. 6 is a block diagram of acousto-haptic transducers integrated with a surround sound system, according to an illustrative embodiment of the invention.

In certain embodiments, acousto-haptic transducers may be combined with one or more speakers. Two such embodiments are shown in FIGS. 5 and 6. FIG. 5 is a block diagram of two acousto-haptic transducers and two speakers coupled to a controller, according to an illustrative embodiment of the invention. System 500 includes two speakers 502*a* and 502*b* connected to the input electrical signal source. System 500 allows a user to separately enjoy the audio through speakers 502*a* and 502*b*, while experiencing the haptic effects through transducers 100*a* and 100*b*. In certain embodiments, the transducers 100*a* and 100*b* can be driven separately by an electrical signal generator 504, which may be separate from the incoming signal source which contains audio information. The various signals may be switched at switching circuitry 506 and drive the transducers 100*a* and 100*b*. The system 500 may include drivers 512 and 514, and splitter and/or amplifier elements 508 and 510.

Many, if not most homes are equipped with multispeaker systems for generating an immersive surround sound that envelopes a user. Such a system will be further enhanced with the inclusion of one or more acousto-haptic transducers integrated, using suitable processing circuitry, with a conventional surround sound system for a fully-immersive entertainment experience. FIG. 6 is a block diagram of an exemplary acousto-haptic transducers integrated with a surround sound system, according to an illustrative embodiment of the invention. In particular, FIG. 6 shows a surround sound system 600 and acoustohaptic transducers 604 and 606 connected together to a media source. Transducer 604 may be housed in a compact adjustable housing for attaching to a user's body, for example about the shoulder and on the sternum. Transducer 606 may be configured to be positioned in close proximity to a chair or sofa or another piece of furniture that the user is in contact with. Transducers 604 and 606 are connected to the media source through processing circuitry 602. Processing circuitry 602 may be similar to processing circuitry described above with reference to FIGS. 3-5.

In certain embodiments, processing circuitry 602 can send different signals, each based on an electrical signal received from a source of data, to different destinations. The different destinations can include audio speakers and transducers 604 and 606 that are differentiated by their position relative to the body. For example, the electrical signals generated by channel separation can be transmitted to speakers or transducers having appropriate positions relative to the body. In particular, signals intended to be experienced from the left can be sent to speakers or vibrators left of the left-right median plane, signals intended to be experienced from the right can be sent to speakers or transducers right of the left-right median plane, signals intended to be experienced from the rear can be sent to speakers or transducers rear of the front-back coronal plane, and signals intended to be experienced from the front can be sent to speakers or vibrators anterior of the front-back coronal plane. Exemplary systems can include a rear transducers for receiving a rear channel generated by channel separation processing circuitry. Exemplary torso transducers 604, can include a left transducer and a right transducer for receiving, respectively, a left channel and a right channel generated by channel separation processing circuitry.

Processing circuitry can also combine multiple functions and can apply different sets of functions to electrical signals depending on their destinations. Preferably, signals sent to transducers have undergone bass enhancement. Different speakers and transducers may also each have individual controllers to allow the user more flexibility in controlling the immersive experience.

As shown in FIG. 6 transducers 606 may be in contact or in close proximity to a piece of furniture such as a couch 608, which in turn may be in direct contact with a user. Similarly, transducers 606 may be positioned in another part of the room that may be in indirect contact with a user. For example, transducer 606 may be positioned in contact with a wall in the room. In such an example, the transducer 606 may be facing the wall or facing away from the wall. In certain embodiments when the transducer 606 is facing away from the wall, acoustic signals can travel from the transducer 606 to the user 5 through the air in between, while the haptic signals may travel through the walls and furniture to the user.

Depending on the desired application, the mass of the mass element in transducers 606 may be selected. In certain embodiments, the more indirect the path of the haptic signal from the transducer 606 to the user, the greater the desired mass of the mass element of the transducer 606. In one example, the mass may be selected to be larger than 20 g as desired for providing users with an acousto-haptic effect in large movie theaters. In the case of a home theater system, for example, the masses in the range of 0.1-20 g would not apply if an indirect method of haptic delivery is used, for example by mounting the acoustohaptic transducer to a wall in the room. Because such range of masses are based on the assumption that the resonant module is in direct contact with the user (i.e., it is used in a cell phone, headphone, or KOR-fx type system). Such devices are low mass enough to allow the small resonant masses mentioned to produce sufficiently strong haptic effects for the user. However, for a home theater system or like larger scale system, then the mass can have a 20 much larger size, even in Kgs (e.g. for movie theater walls).

It will be apparent to those of ordinary skill in the art that certain aspects involved I the operation of the controller 302 may be embodied in a computer program product that includes a computer usable and/or readable medium. For example, such a computer usable medium may consist of a read only memory device, such as a CD ROM disk or conventional ROM devices, or a random access memory, such as a hard drive device or a computer diskette, or flash memory device having a computer readable program code stored thereon.

Figure 7:
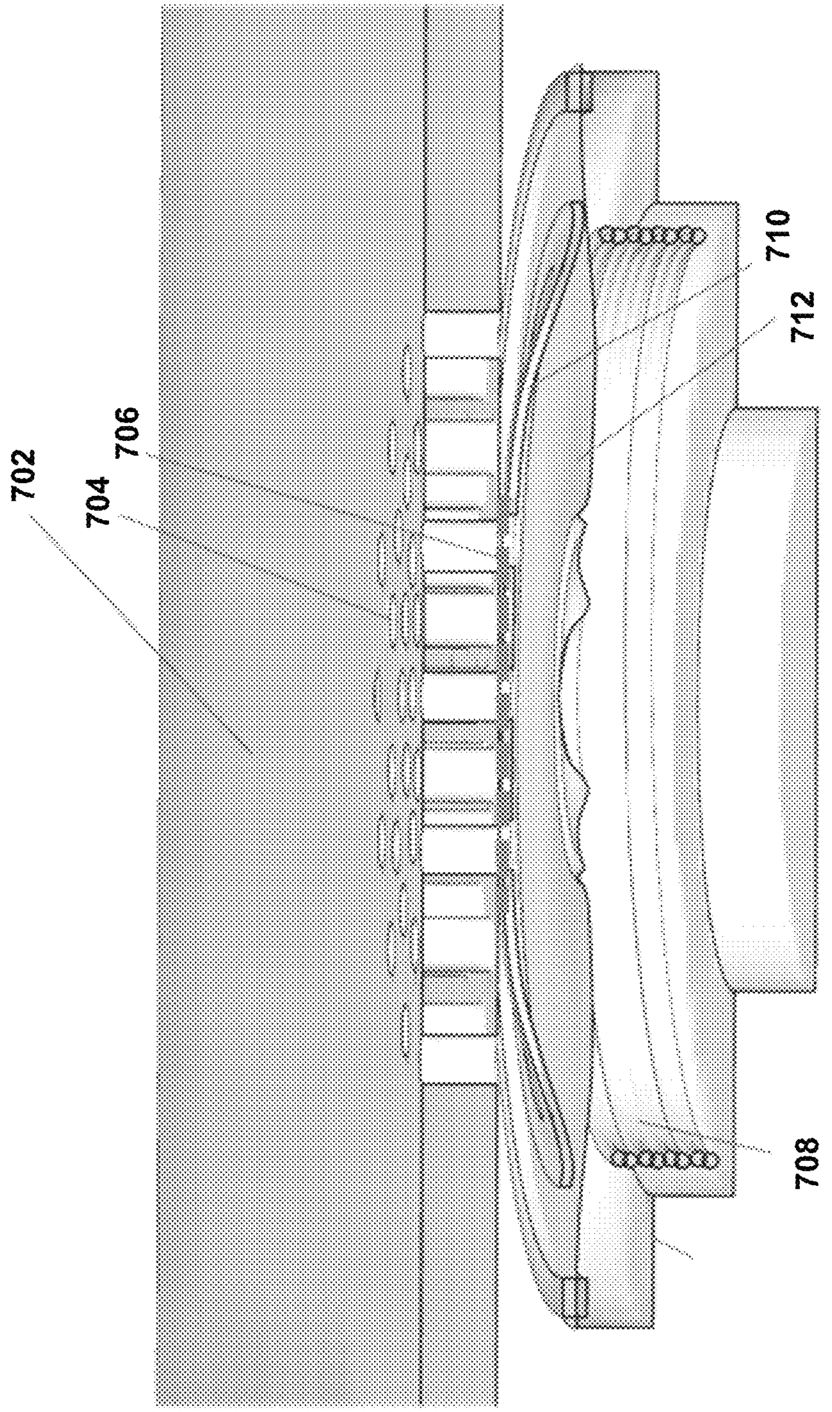
FIG. 7 depicts a side view of a Thin Film Coupled ACH speaker, according to an illustrative embodiment of the invention.

FIG. 7 depicts a side view of a Thin Film Coupled ACH speaker, according to an illustrative embodiment of the invention. Speaker 700 includes body 702 (e.g., the outside body of a mobile device), sound port 704, and adhesive 706 (e.g., glue). Speaker 700 also includes voicecoil 708, thin film coupler 710, and diaphragm 712.

For example, speaker 700 may be coupled to the sound port on the body of the mobile device by means of a Thin Film Coupler (TFC) made from mylar, BoPET etc. Speaker 700 may be allowed to freely move within maxima of vertical displacement, and by means of TFC, forms a resonator. Since the mass of the speaker itself acts as an inertial mass, there is no need for an additional mass element. This kind of resonator has excellent low frequency (30-150 Hz) response, allowing the audio signal to carry both audible sound in f_audio>~250 Hz range, and haptic vibrations in f_haptic<~250 Hz by means of frequency shelfing.

Figure 8:
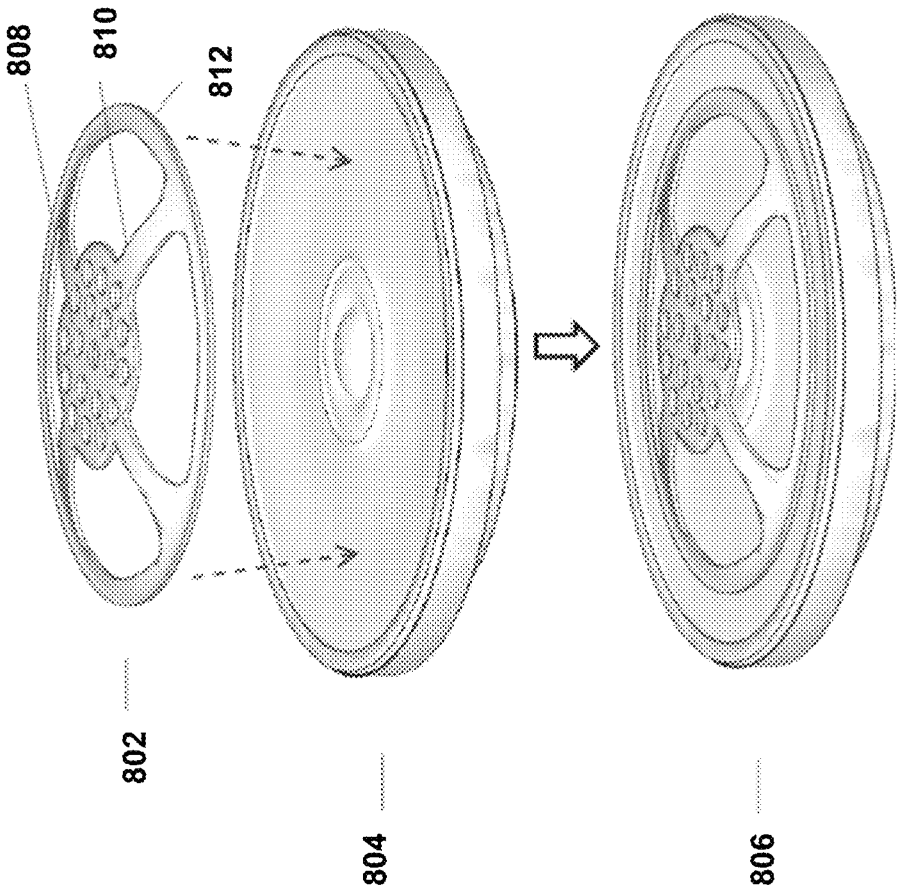
FIG. 8 depicts an exploded view of a Thin Film Coupled ACH speaker, according to an illustrative embodiment of the invention.

FIG. 8 depicts an exploded view of a Thin Film Coupled ACH speaker, according to an illustrative embodiment of the invention. FIG. 8 includes coupler 802 (e.g., a thin film coupler), microspeaker 804, and speaker 806 (e.g., ACH speaker). Coupler 802 includes platform 808 (e.g., a coupling platform), pole 810, and rim 812.

For example, an appropriately formed Thin Film Coupler (e.g., coupler 802) made from Mylar, BoPET, etc. (e.g. as shown above,) is glued to the surface of the full-range micro speaker diaphragm (e.g., microspeaker 804) in such a way that the only section of coupler 802 in contact with the diaphragm is rim 812 of the coupler 802, allowing easy formation of transverse surface vibrations on the diaphragm, while transferring vertical vibrations to platform 808 (e.g., a coupling platform) via one or more of pole 810. Platform 808 may have holes to allow sound passage. Coupler 802 is extremely cheap to make and adds a huge value to speaker 806. Rim 812 can be made from softer material to better allow transverse surface waves. Rim 812 can be eliminated if pole 810 is glued independently to diaphragm.

Figure 9:
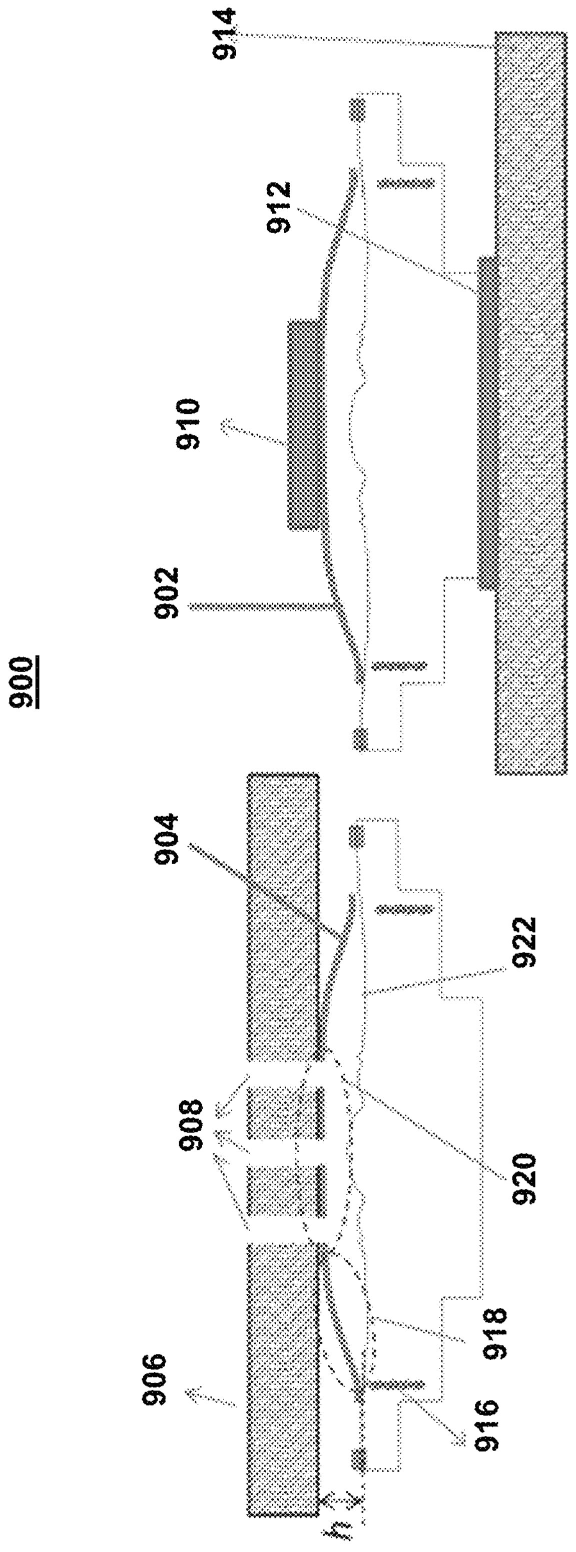
FIG. 9 depicts a side view of a Thin Film Resonator, according to an illustrative embodiment of the invention.

FIG. 9 depicts a side view of a Thin Film Resonator, according to an illustrative embodiment of the invention. For example, as shown the resonator 902 (e.g., a thin film resonator) has mass attached to thin film. Coupler 904 (e.g., a Thin Film Coupler) uses the speaker's own mass as inertial mass. The speaker may include wall 906 (e.g., wall, with or without soundport 908), which made from e.g. cardboard, plastic, etc.). The speaker may include inertial mass 910. The speaker may also include a mounting buffer 912 and mounting surface 914. The speaker also includes voice coil 916, pole 918, coupling platform 920, and diaphragm 922.

Poles (e.g., pole 918) can have curves or ripples, or be 1 or more poles. Height h should be such that the mixima in vibration do not cause the speaker to hit any structure directly. The rim allows curvature stability in materials like BoPET, metalized mylar etc., but if Aluminum is used, then a rim may not be necessary, and a minimal pole contact can be glued to the diaphragm, to avoid dampening audio output. The contact point should be as small as possible (nearly the size of voicecoil contact area on the diaphragm) and be ideally glued exactly over the voicecoil 916. In BoPETMylar TFR and TFC, the rim may be eliminated as well, especially if the pole curvatures are thermoformed into the films, and the poles are larger. In BoPET, Mylar TFC, the CP can be glued to a thin metal plate that can in turn be glued to the surface that will be vibrating and delivering haptic feedback to the user. This may allow easier assembly installment at the manufacturing assembly line of the mobile device in which ACH is being used.

In TFC ACH speakers, wires carrying signal to the speaker can be connected to the voicecoil via the poles to prevent the shaking and breaking of solder points. Wires could also be attached to flexible circuit that can tolerate vibration, and in traditional solders, rubber/silicone glue can be applied to solder points to eliminate fatigue and wear and tear of the wires due to constant vibration of the speaker. In TFR, ACH can be mounted either by directly attaching it to the surface to be vibrated, or a thin layer of poron/silcone rubber buffer (Mounting buffer) that is glued to both the ACH and the surface below it, can be used in between as shown above to allow the mass of the speaker to also vibrate and amplify the vibrational effects.

Figure 10:
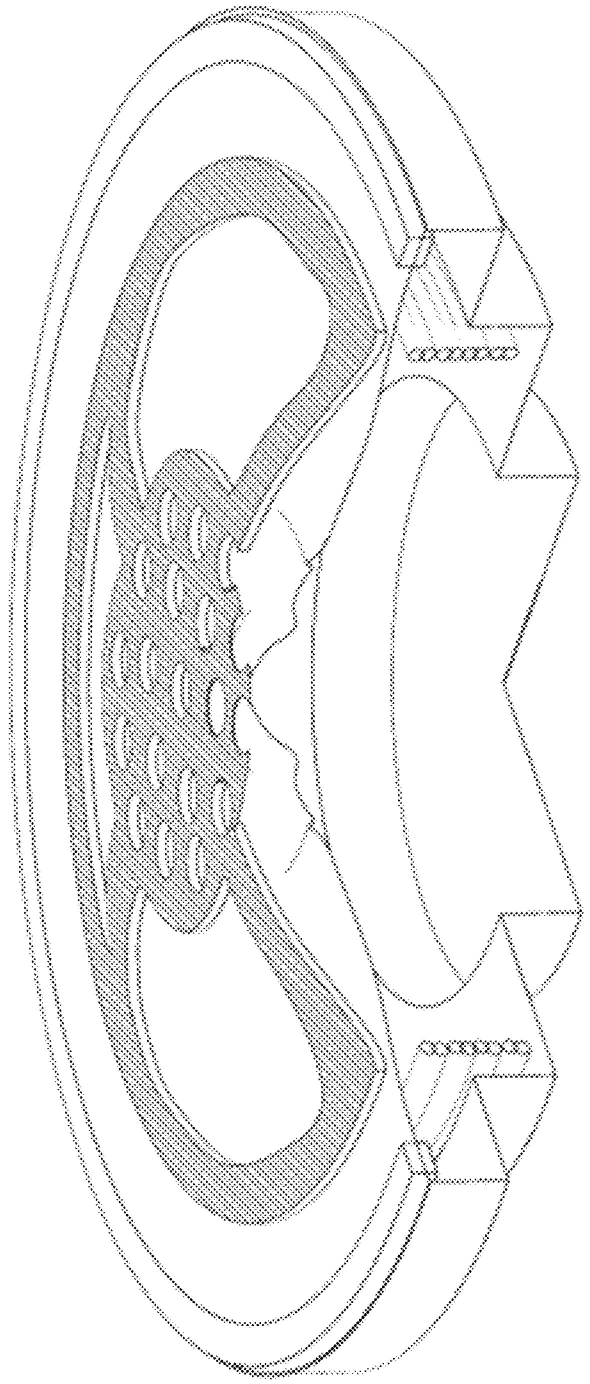
FIG. 10 depicts a view of a Thin Film Coupler mounted above the voice coil, according to an illustrative embodiment of the invention.

FIG. 10 depicts a view of a Thin Film Coupler mounted above the voice coil, according to an illustrative embodiment of the invention. For example, TFC mounted above the voice coil to allow best vertical displacement energy transfer. The speaker may be a full-range speaker, ideally capable of producing 20-20 KHz vibrations, providing a wide bandwidth of resonance, in contrast to LRAs that have a narrow resonance band. During a voice call on the phone, haptic frequencies are eliminated via an inline or software filter to avoid shaking of the phone. In other applications, the user can have an option to activate or deactivate such filters.

Figure 11:
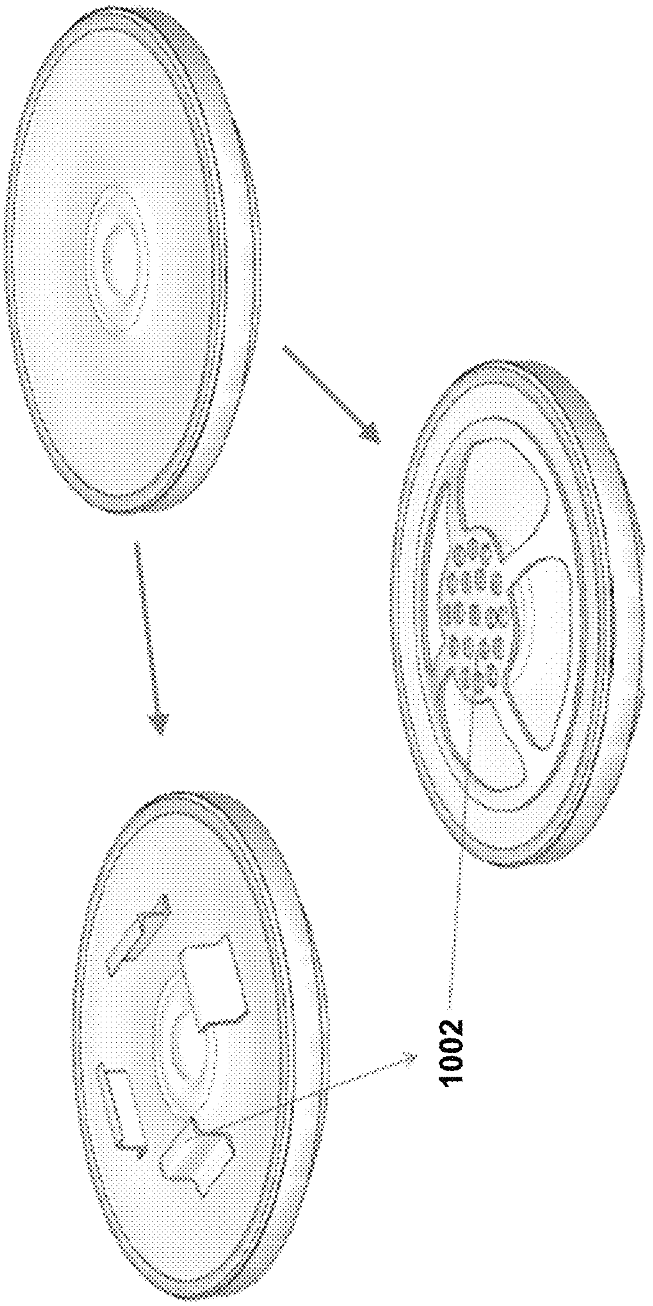
FIG. 11 depicts Thin Film Coupler embodiments, according to an illustrative embodiment of the invention.

FIG. 11 depicts Thin Film Coupler embodiments, according to an illustrative embodiment of the invention. For example, FIG. 11 include coupler platform 1002. Any structure that allows the speaker to be attached to a sound port on a surface, while allowing sound to pass can be an embodiment. Coupling Platform (CP) is the area that will be rigidly glued to the soundport surface. This is the surface that receives the haptic vibrations at the frequencies allowed by speaker TFC resonator.

Figure 12:
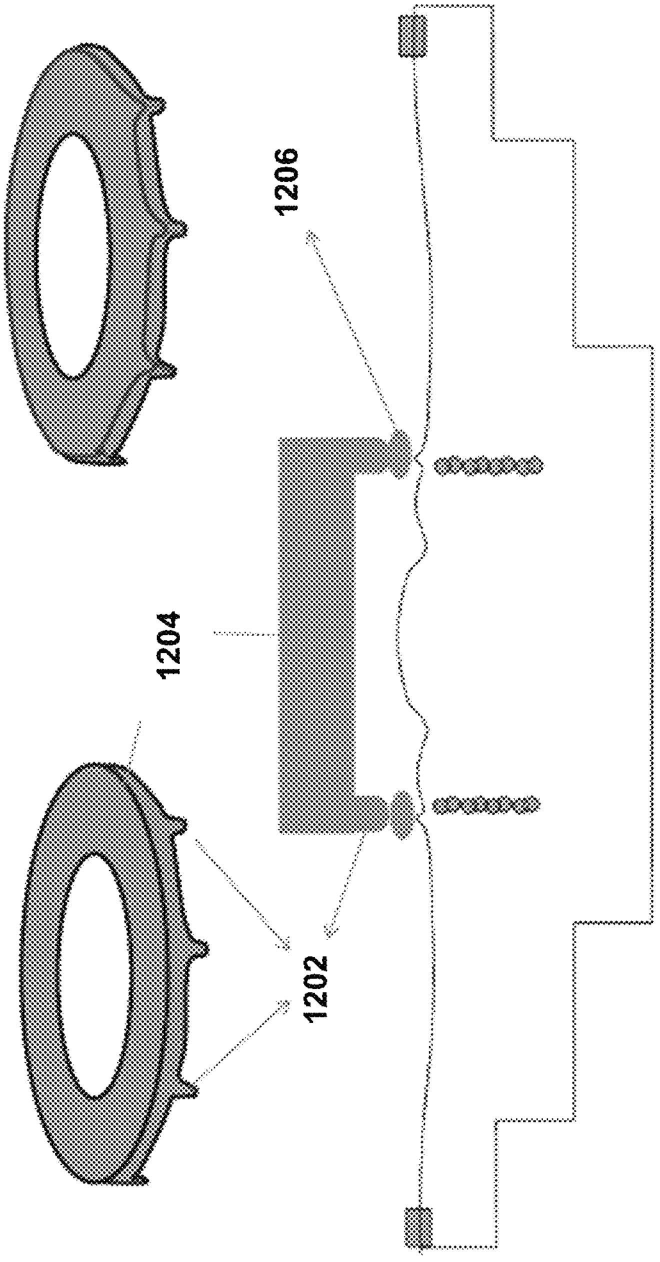
FIG. 12 depicts a Soft Coupled Mass (SCM) embodiment, according to an illustrative embodiment of the invention.

FIG. 12 depicts a Soft Coupled Mass (SCM) embodiment, according to an illustrative embodiment of the invention. FIG. 12 shows poles 1202 and inertial mass 1204. Soft Coupled Mass (SCM) embodiment as shown above has protruding Poles (entire mass can be easily produced from a single sheet metal by stamping) that are mounted on the diaphragm via soft micro dot adhesive such as soft silicone rubber that allows easy bending on the surface of the diaphragm to allow wave formation, yet allows sturdy but minial surface adhesion of the mass to the surface of the diaphragm. It is desirable to decrease the height and increase the diameter (lateral dimensions, orthogonal to height) so that the same mass contributes minimally to speaker overall height.

Figure 13:
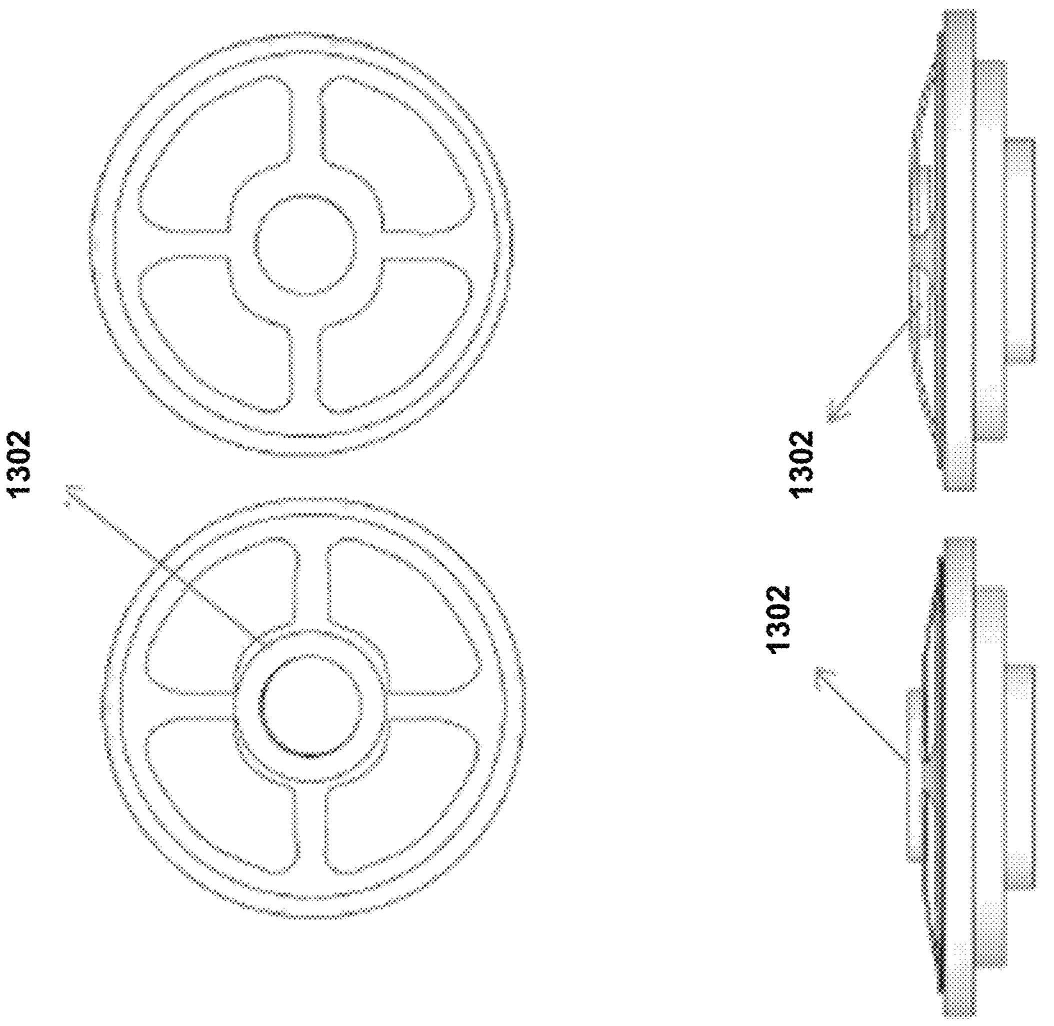
FIG. 13 depicts a Mass-coupled Thin Film Resonator embodiment, according to an illustrative embodiment of the invention.

FIG. 13 depicts a Mass-coupled Thin Film Resonator embodiment, according to an illustrative embodiment of the invention. FIG. 13 include inertial mass 1302.

TFR made from thin film and an attached mass either on top or bottom of the platform. Of course, care has to be given to ensuring that the inertial mass does not hit the diaphragm or other structures during maxima of resonant vibration. In this embodiment, the speaker can be rigidly housed, so that the only part allowed to freely move is the inertial mass and TF structure. Various shapes and sizes for all elements above can be configured, and is claimed under this disclosure. TFR can be monolithic with the diaphragm (form a continuous form, so no glue is needed to mount TFR). Also, TFR and TFC can be made from more stiff material like Aluminum thick foil etc. Vertical stiffness is very high for the poles, while laterally its more flexible to allow formation of waves on diaphragm surface.

Figure 14:
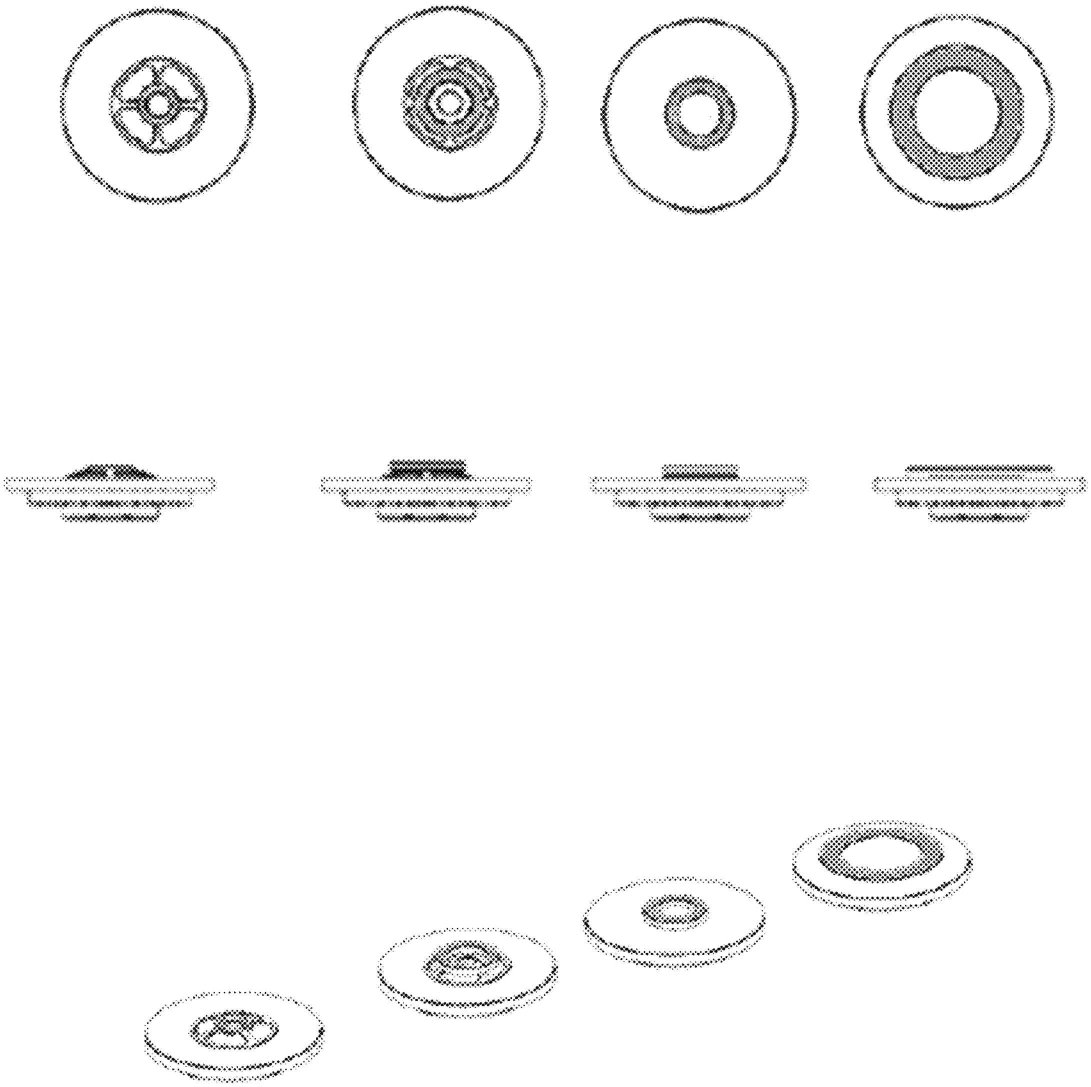
FIG. 14 depicts various Mass-coupled Thin Film Resonator embodiments, according to an illustrative embodiment of the invention.

FIG. 14 depicts various Mass-coupled Thin Film Resonator embodiments, according to an illustrative embodiment of the invention. Gray annuli are the inertial mass. Rims are preferably mounted above the voice coil. In case of bare mass systems, glue under the mass connecting it to the diaphragm is soft, allowing development of transverse waves on the surface of the speaker diaphragm, producing high quality sound. In some embodiments, by using rigid glue, and placement over areas of high audio output on a diaphragm, one can turn the system to a haptic-only system, with minimal audible sound emission.

Figure 15:
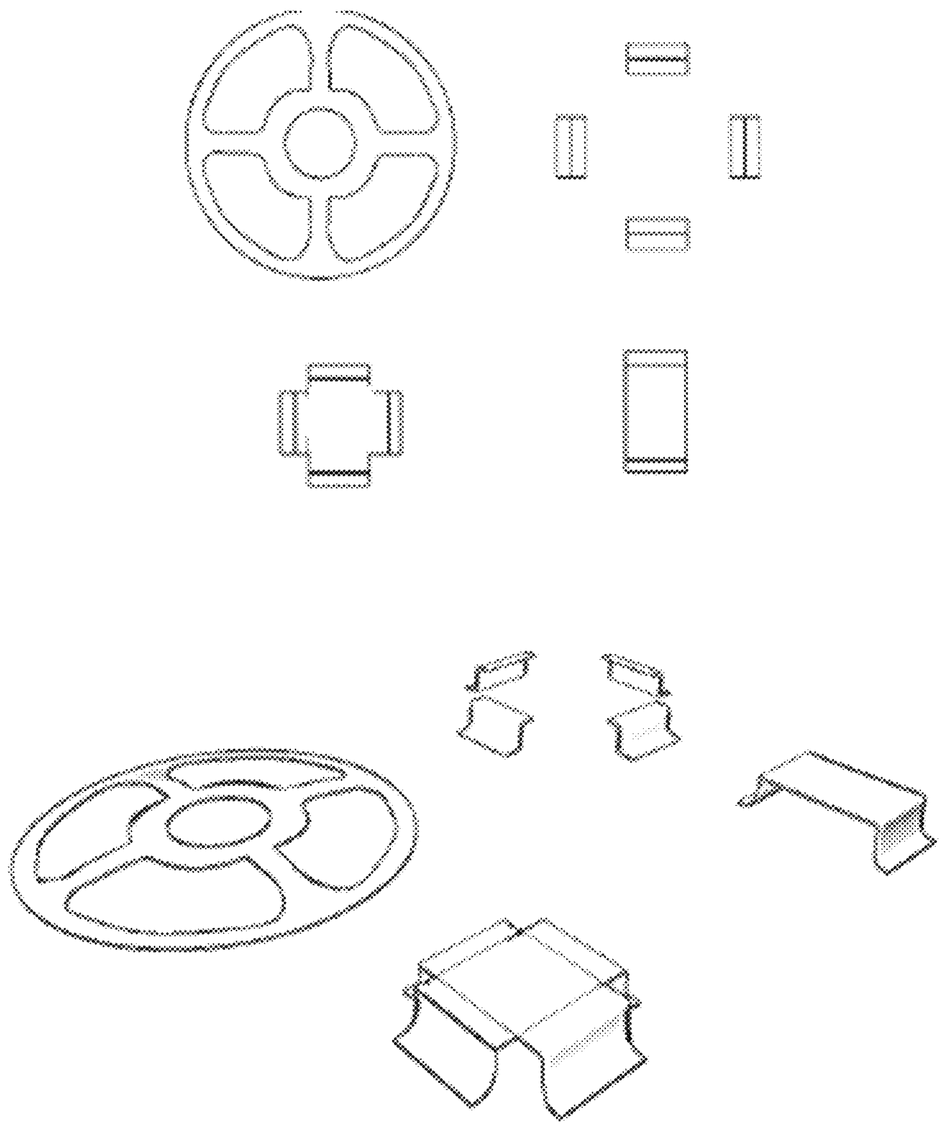
FIG. 15 depicts various Thin Film Coupler embodiments, according to an illustrative embodiment 5 of the invention.

FIG. 15 depicts various Thin Film Coupler embodiments, according to an illustrative embodiment 5 of the invention. TFCs mad from BoPET, Mylar etc. for various applications. There can be soundport holes on the Coupling Platforms (CP) on top.

Figure 16:
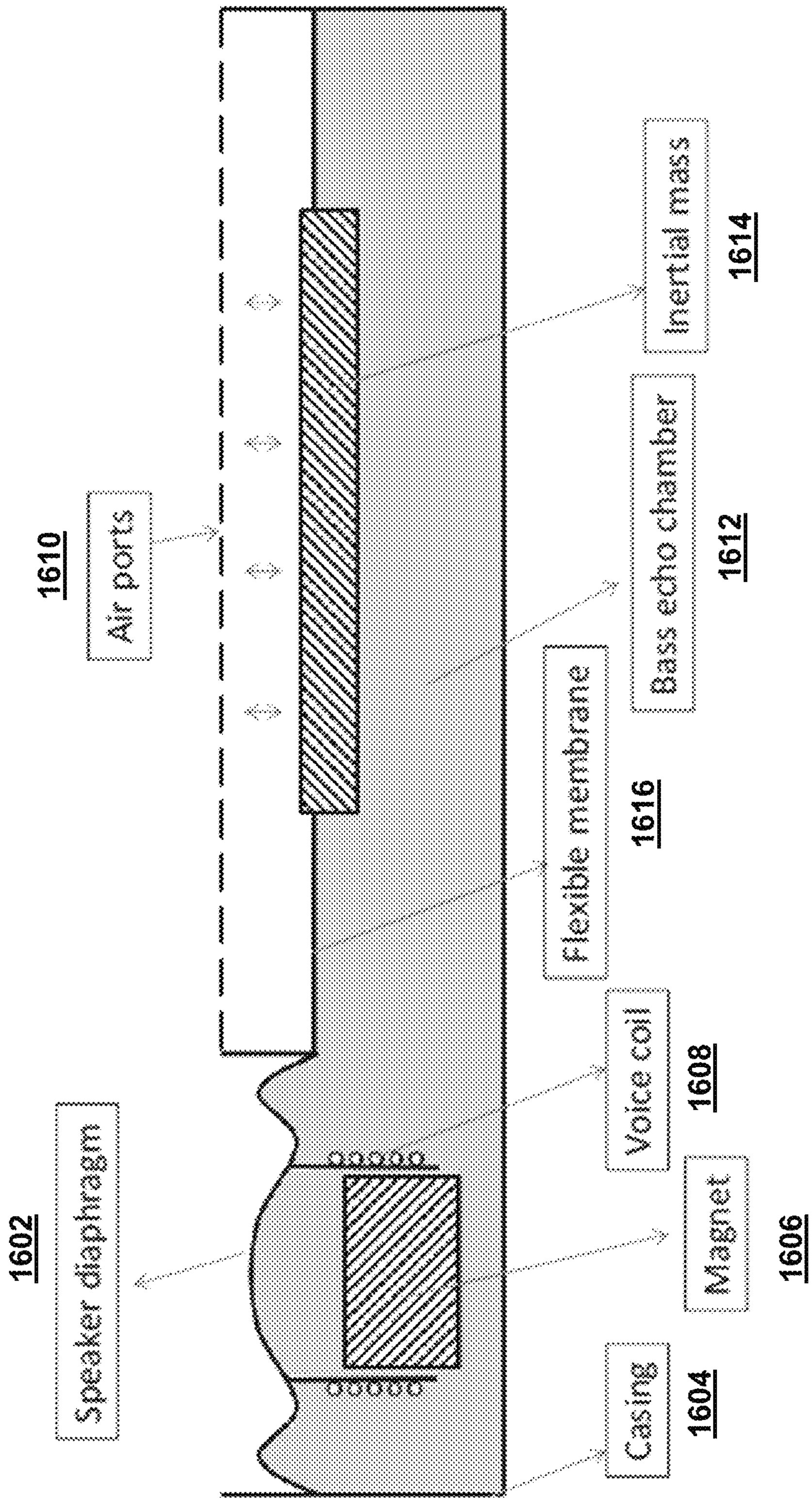
FIG. 16 depicts a side view of a speaker, according to an illustrative embodiment of the invention.

FIG. 16 depicts a side view of a speaker, according to an illustrative embodiment of the invention. FIG. 16 include speaker diaphragm 1602, casing 1604, magnet 1606, voice coil 1608. FIG. 16 also include air ports 1610, flexible membrane 1616, base echo chamber 1612, and inertial mass 1614.

In this embodiment, resonant inertial mass is coupled to the speaker diaphragm via sound pressure. The backside of diaphragm is fully out of phase with the audio that is emanated from speaker. If an air-tight echo chamber is formed, and a resonant mass is attached to a thin vibrating membrane as shown above, the mass can vibrate in resonance to bass (in haptic) frequency and produce tactile effects. Airports should be provided to allow air movement as the mass is displaced. The entire system can be transported directly to the back of the speaker instead of the lateral arrangement shown above, using the same principles disclosed above.

Figure 17:
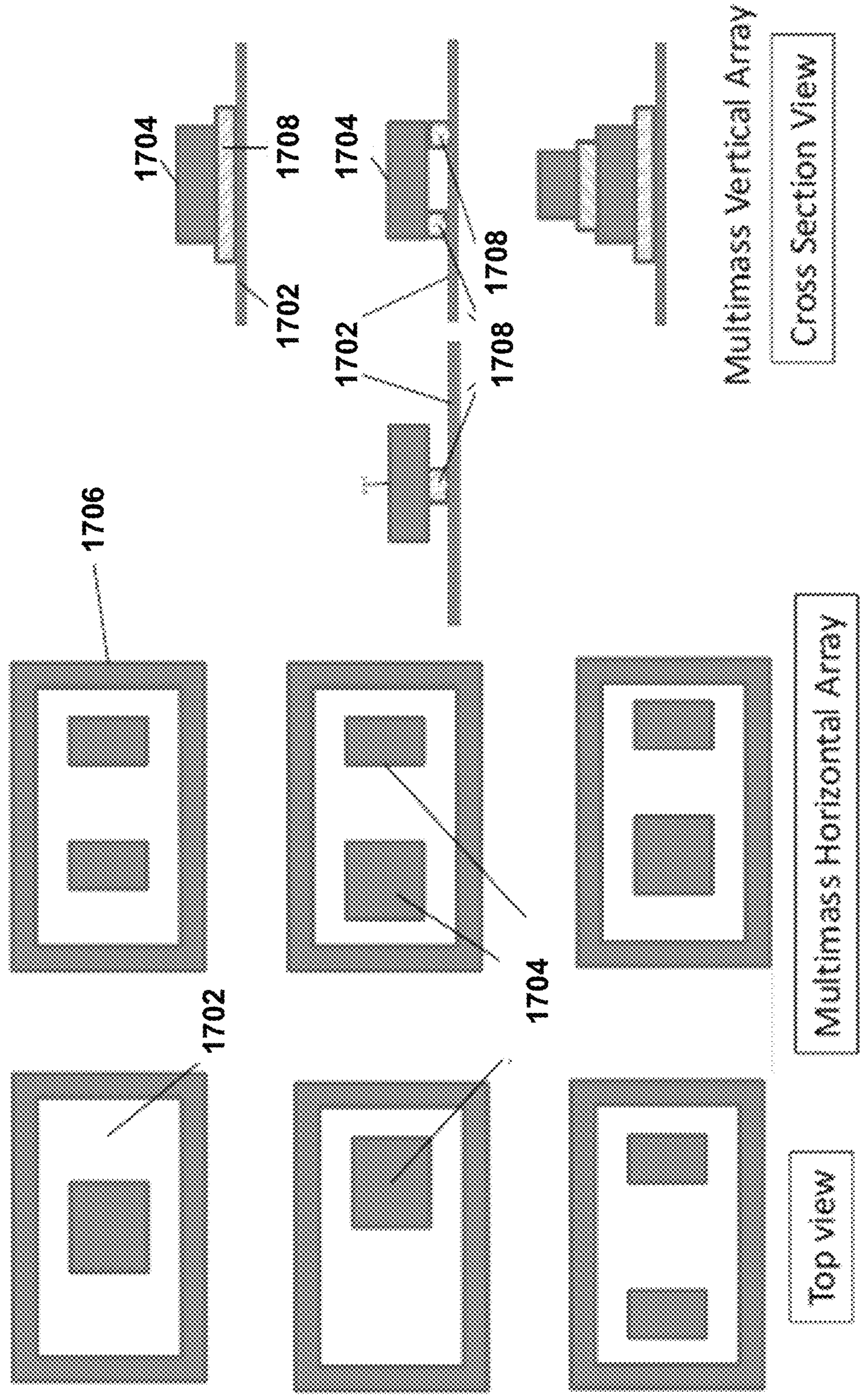
FIG. 17 depicts various positioning of masses on a diaphragm, according to an illustrative embodiment of the invention.

FIG. 17 depicts various positioning of masses on a diaphragm, according to an illustrative embodiment of the invention. For example, FIG. 17 include diaphragm(s) 1702, mass(es) 1704, speaker frame(s) 1706, and PE foam film 1708.

Masses can be attached to the diaphragm via Double adhesive PE or XLPE or other open or closed cell foam. The Foam allows sound to escape freely, while lower frequencies produce inertial vibration of the masses. Asymetric arrangement of the mass can create additional modes, and multi-mass units either in horizontal or vertical arrangement can also be symmetric or asymmetric. An overflow region of PE is desired to allow cushioning for the edges of the mass to reduce damage to the diaphragm.

Figure 18:
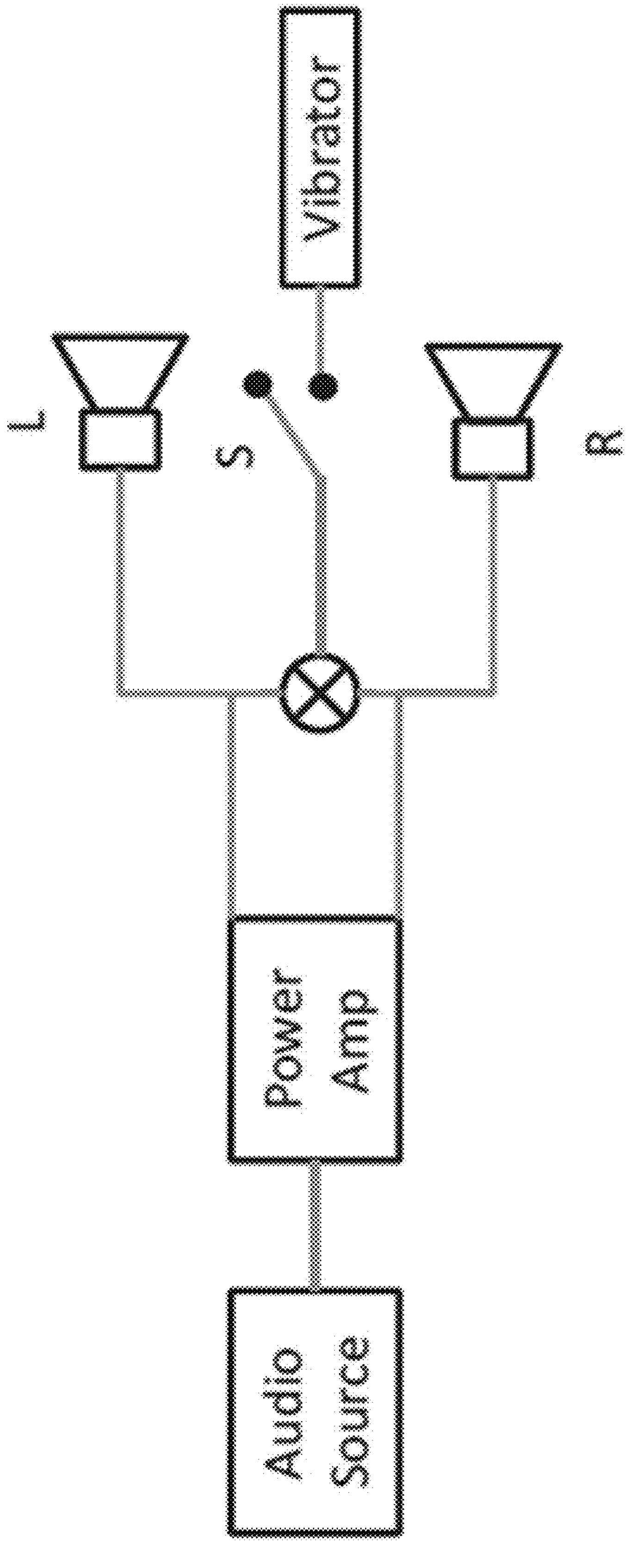
FIG. 18 depicts a digital switch, according to an illustrative embodiment of the invention.

FIG. 18 depicts a digital switch, according to an illustrative embodiment of the invention. Switch S can be either a physical or digital switch, and can turn the gaming vibrator on or off, when it is not desirable to have vibrations when voice communication is being conducted. It can also be automatically activated upon receiving a call. An optional Filter for the low frequencies can be placed for Vibrator feed, either after amplification, or before amplification to separate right and left audio outputs.

Figure 19:
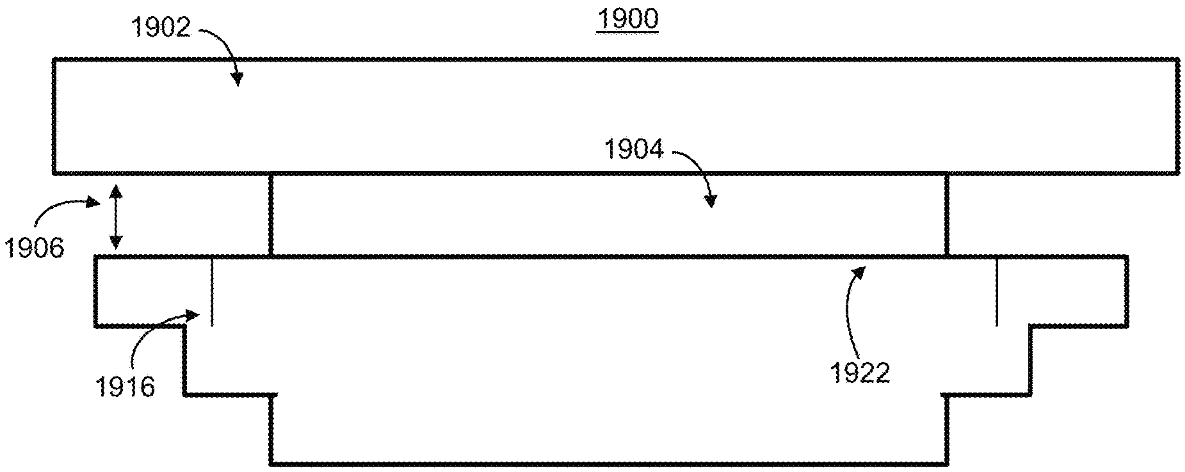
FIG. 19 depicts a side view of a Thin Film Resonator, according to an illustrative embodiment of the invention.

FIG. 19 depicts a side view of a Thin Film Resonator, according to an illustrative embodiment of the invention. For example, as shown the resonator 1900 (e.g., a thin film resonator). In this embodiment, diaphragm 1922 is rigidly attached to platform 1902. Platform 1902 may be a wall or other rigid platform. Resonator 1900 also include attachment 1904 (which may have thickness 1906), which may be a rigid and/or soft piece attaching diaphragm 1922 to platform 1092. This allows that weight of the entire speaker unit to act as inertial mass in the same manner as shown in FIG. 9 (e.g., in the left configuration) to produce haptic only effects with audible sounds completely muffled. By sending only haptic range signals, a fast rise and fall time is achieved along with wideband haptic frequencies, and high definition haptic effects, as well as legacy effects. The speaker also includes voice coil 1916.

The foregoing embodiments are merely examples of various configurations of components of vibration systems described and disclosed herein and are not to be understood as limiting in any way. Additional configurations can be readily deduced from the foregoing, including combinations thereof, and such configurations and continuations are included within the scope of the invention. Variations, modifications, and other implementations of what is described may be employed without departing from the spirit and the scope of the invention. More specifically, any of the method, system and device features described above or incorporated by reference may be combined with any other suitable method, system, or device features disclosed herein or incorporated by reference, and is within the scope of the contemplated inventions.

The above-described embodiments of the present disclosure are presented for purposes of illustration, and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A transducer capable of generating acoustic and haptic signals, comprising: a speaker, including a diaphragm, configured to transform an electrical signal having audio information in a first range of frequencies, into an acoustic signal, an echo chamber formed adjacent to the diaphragm, and a mass element attached to the diaphragm, wherein the mass of the mass element is selected such that a portion of a resonant frequency range of the combination of the speaker and the mass element falls within the first range of frequencies.
2. The transducer of any one of the proceeding embodiments, wherein the diaphragm is substantially rigid and the speaker further comprises a semi-rigid diaphragm attached to a voice coil and rigid diaphragm, such that the echo chamber is formed in the region enclosed by the semi-rigid diaphragm and the rigid diaphragm.
3. The transducer of any one of the proceeding embodiments, wherein the rigid diaphragm is cone-shaped and the semirigid diaphragm is substantially hemispherical shaped.
4. The transducer of any one of the proceeding embodiments, wherein the mass element is removably attached to the diaphragm.
5. The transducer of any one of the proceeding embodiments, wherein the mass element is glued to the center region of the diaphragm.
6. The transducer of any one of the proceeding embodiments, wherein the mass element is formed from a rigid material having a mass in the range of about 0.1 g to 20 g.
7. The transducer of any one of the proceeding embodiments, wherein the mass element is formed from a metal.
8. The transducer of any one of the proceeding embodiments, wherein the mass element is disk-shaped.
9. The transducer of any one of the proceeding embodiments, wherein the ratio of surface area of the top surface of the diaphragm to the surface area of the top surface of the mass element is about 4:1.
10. The transducer of any one of the proceeding embodiments, wherein the speaker further includes a voice coil attached to a diaphragm for receiving the electrical signal and moving the diaphragm in response to the electrical signal, and a spider attached to the voice coil for damping oscillations of the voice coil, the diaphragm and the mass element.
11. The transducer of any one of the proceeding embodiments, further comprising a holder attached to the diaphragm for holding the mass element.
12. The transducer of any one of the proceeding embodiments, comprising a plurality of mass elements removably stacked on top of each other.
13. The transducer of any one of the proceeding embodiments, further comprising a housing having a cap such that the speaker and mass element are disposed within the housing.
14. The transducer of any one of the proceeding embodiments, wherein the diaphragm is capable of moving up to a maximum height within the housing, and wherein the mass element has a height selected such that when the diaphragm has moved up to the maximum height, the mass element is within the housing and below the cap.
15. The transducer of any one of the proceeding embodiments wherein the speaker is a full-range speaker.
16. The transducer of any one of the proceeding embodiments, wherein resonant frequency range is from 2 to 800 Hz.
17. The transducer of any one of the proceeding embodiments, comprising a controller connected to a source of the electrical signal and the speaker for splitting the electrical signal and driving the speaker and the mass element with at least one of a signal containing information in the audible frequencies, and a signal containing information in the haptic frequencies.
18. The transducer of any one of the proceeding embodiments, wherein the controller is configured to amplify the signal containing information in the haptic frequencies.
19. A transducer capable of generating acoustic and haptic signals, comprising: a speaker, including a diaphragm, configured to transform an electrical signal having audio information in a first range of frequencies, into an acoustic signal, a mass element attached to the diaphragm, and a rotation assembly including a socket, and a ball attached to a portion of the speaker, the ball being configured to fit within the socket, wherein the mass of the mass element is selected such that a portion of a resonant frequency range of the combination of the speaker and the mass element falls within the first range of frequencies, and wherein the speaker is configured to rotated within the socket.
20. The transducer of any one of the proceeding embodiments, further comprising a sponge block positioned within the socket, wherein the ball is positioned on a surface of the sponge block.
21. A transducer capable of generating acoustic and tactile signals from an electrical signal having audio information, comprising: a commercially-available speaker, having a voice coil and a diaphragm disposed within a housing, capable of generating an acoustic signals from electrical signals having audio information within a first range of frequencies, an echo chamber formed between the diaphragm and the voice coil, and a mass element coupled to the diaphragm, wherein the mass element is selected such that the transducer has a resonant frequency that falls within the first range of frequencies.
22. A system of generating acoustic and tactile signals from an electrical signal having audio information, comprising: a transducer, having a voice coil configured to receive an output electrical signal having information within a output range of frequencies, a diaphragm and a spider coupled to the voice coil, an echo chamber formed between the diaphragm and the voice coil, and a mass element coupled to at least one of the voice coil and the diaphragm, and having a mass selected such that the resonant frequency of the transducer is within the output range of frequencies; and a controller, comprising a splitter for receiving an input electrical signal, and splitting 5 the input electrical signal into at least a first portion having a first range of frequencies and a second portion having a second range of frequencies, wherein the resonant frequency is within the second range of frequencies, an amplifier, for amplifying the second portion, and a switch connected to the splitter and the amplifier, configured to receive the first portion, the amplified second portion and a combination of the first portion and the amplified second portion.

23. A system of generating acoustic and tactile signals from an electrical signal having audio information, comprising: a transducer, having a voice coil configured to receive an output electrical signal having information within a output range of frequencies, a diaphragm and a spider coupled to the voice coil, a rotation assembly including a socket, and a ball attached to a portion of the transducer, the ball being configured to fit within the socket, wherein the transducer is configured to rotate within the socket, and a mass element coupled to at least one of the voice coil and the diaphragm, and having a mass selected such that the resonant frequency of the transducer is within the output range of frequencies; and a controller, comprising a splitter for receiving an input electrical signal, and splitting the input electrical signal into at least a first portion having a first range of frequencies and a second portion having a second range of frequencies, wherein the resonant frequency is within the second range of frequencies, an amplifier, for amplifying the second portion, and a switch connected to the splitter and the amplifier, configured to receive the first portion, the amplified second portion and a combination of the first portion and the amplified second portion.

24. A method of generating acoustic and tactile signals from an electrical signal having information within a first range of frequencies, comprising: providing a transducer having a mass element disposed on a diaphragm of a speaker, wherein, the mass of the mass element is selected such that a portion of a resonant frequency range of the transducer falls within the first range of frequencies, and an echo chamber formed adjacent to the diaphragm; receiving, at the transducer, the electrical signals; generating, at the transducer, acoustic signals due to the vibration of the diaphragm, and haptic signals due to the resonance of the transducer created by the movement of the mass element at a frequency within the resonant frequency range, such that the haptic signals are amplified by the echo chamber.

25. The method of any one of the proceeding embodiments, wherein the speaker includes a voice coil for receiving the electrical signals, and a spider connected to the voice coil, the method further comprising damping, by the spider, the vibration of the diaphragm and the movement of the mass element.

26. A method of manufacturing a transducer capable of generating acoustic and haptic signals from an electrical signal, comprising: providing an acoustic transducer having a rigid diaphragm, spider and voice coil, attaching a mass element to the diaphragm, and attaching a semi-rigid diaphragm adjacent to the rigid diaphragm to form an echo chamber, wherein the mass element includes a rigid metal having a mass selected such that the resonant frequency of the acoustic transducer combined with the mass element falls within a range of frequencies of the electrical signal.

27. A method of manufacturing a transducer capable of generating acoustic and haptic signals from an electrical signal, comprising: providing an acoustic transducer having a rigid diaphragm, spider and voice coil, attaching a mass element to the diaphragm, and attaching a rotation assembly including a socket, and a ball to a portion of the transducer, the ball being configured to fit within the socket, wherein the transducer is configured to rotated within the socket, wherein the mass element includes a rigid metal having a mass selected such that the resonant frequency of the acoustic transducer combined with the mass element falls within a range of frequencies of the electrical signal.

28. A transducer capable of generating acoustic and haptic signals, comprising: a speaker, including a diaphragm, configured to transform an electrical signal having audio information in a first range of frequencies, into an acoustic signal, a holder attached to a portion of the diaphragm, the holder includes an opening positioned above a center region of the diaphragm, and a mass element attached to the holder above the center region of the diaphragm, the mass element having an opening positioned above the opening of the holder, wherein the mass of the mass element is selected such that a portion of a resonant frequency range of the combination of at least the speaker and the mass element falls within the first range of frequencies, and wherein the opening of the mass element and the opening of the holder are positioned such that at least a portion of the acoustic signal passes from the speaker and through the openings.

29. A transducer capable of generating acoustic and haptic signals, comprising: a speaker, including a diaphragm, configured to transform an electrical signal having audio information in a first range of frequencies, into an acoustic signal, an echo chamber formed adjacent to the diaphragm, and a mass element attached to the diaphragm by a holder, wherein the mass of the mass element is selected such that a portion of a resonant frequency range of the combination of the speaker and the mass element falls within the first range of frequencies.

30. The transducer of any one of the proceeding embodiments, wherein the diaphragm is substantially rigid and the speaker further comprises a semi-rigid diaphragm attached to a voice coil and rigid diaphragm, such that the echo chamber is formed in the region enclosed by the semi-rigid diaphragm and the rigid diaphragm.

31. The transducer of any one of the proceeding embodiments, wherein the rigid diaphragm is cone-shaped and the semirigid diaphragm is substantially hemispherical shaped.

32. The transducer of any one of the proceeding embodiments, wherein the mass element is removably attached to the diaphragm.

33. The transducer of any one of the proceeding embodiments, wherein the mass element is glued to the center region of the diaphragm.

34. The transducer of any one of the proceeding embodiments, wherein the mass element is formed from a rigid material having a mass in the range of about 0.1 g to 20 g.

35. The transducer of any one of the proceeding embodiments, wherein the mass element is formed from a metal.

36. The transducer of any one of the proceeding embodiments, wherein the mass element is disk-shaped.

37. The transducer of any one of the proceeding embodiments, wherein the ratio of surface area of the top surface of the diaphragm to the surface area of the top surface of the mass element is about 4:1

38. The transducer of any one of the proceeding embodiments, wherein the speaker further includes a voice coil attached to a diaphragm for receiving the electrical signal and moving the diaphragm in response to the electrical signal, and a spider attached to the voice coil for damping oscillations of the voice coil, the diaphragm and the mass element.

39. The transducer of any one of the proceeding embodiments, further comprising a holder attached to the diaphragm for holding the mass element.

40. The transducer of any one of the proceeding embodiments, comprising a plurality of mass 5 elements removably stacked on top of each other.

41. The transducer of any one of the proceeding embodiments, further comprising a housing having a cap such that the speaker and mass element are disposed within the housing.

42. The transducer of any one of the proceeding embodiments, wherein the diaphragm is capable of moving up to a maximum height within the housing, and wherein the mass element has a height selected such that when the diaphragm has moved up to the maximum height, the mass element is within the housing and below the cap.

43. The transducer of any one of the proceeding embodiments, wherein the speaker is a full-range speaker.

44. The transducer of any one of the proceeding embodiments, wherein resonant frequency range is from 2 to 800 Hz.

45. The transducer of any one of the proceeding embodiments, comprising a controller connected to a source of the electrical signal and the speaker for splitting the electrical signal and driving the speaker and the mass element with at least one of a signal containing information in the audible frequencies, and a signal containing information in the haptic frequencies.

46. The transducer of any one of the proceeding embodiments, wherein the controller is configured to amplify the signal containing information in the haptic frequencies.

47. A transducer capable of generating acoustic and haptic signals, comprising: a speaker, including a diaphragm, configured to transform an electrical signal having audio information in a first range of frequencies, into an acoustic signal, a mass element attached to the diaphragm by a holder, and a rotation assembly including a socket, and a ball attached to a portion of the speaker, the ball being configured to fit within the socket, wherein the mass of the mass element is selected such that a portion of a resonant frequency range of the combination of the speaker and the mass element falls within the first range of frequencies, and wherein the speaker is configured to rotated within the socket.

48. The transducer of any one of the proceeding embodiments, further comprising a sponge block positioned within the socket, wherein the ball is positioned on a surface of the sponge block.

49. A transducer capable of generating acoustic and tactile signals from an electrical signal having audio information, comprising: a commercially-available speaker, having a voice coil and a diaphragm disposed within a housing, capable of generating an acoustic signals from electrical signals having audio information within a first range of frequencies, an echo chamber formed between the diaphragm and the voice coil, and a mass element coupled to the diaphragm, wherein the mass element is selected such that the transducer has a resonant frequency that falls within the first range of frequencies.

50. A system of generating acoustic and tactile signals from an electrical signal having audio information, comprising: a transducer, having a voice coil configured to receive an output electrical signal having information within am output range of frequencies, a diaphragm and a spider coupled to the voice coil, an echo chamber formed between the diaphragm and the voice coil and a mass element coupled to at least one of the voice coil and the diaphragm, and having a mass selected such that the resonant frequency of the transducer is within the output range of frequencies; and a controller, comprising a splitter for receiving an input electrical signal, and splitting the input electrical signal into at least a first portion having a first range of frequencies and a second portion having a second range of frequencies, wherein the resonant frequency is within the second range of frequencies, an amplifier, for amplifying the second portion, and a switch connected to the splitter and the amplifier, configured to receive the first portion, the amplified second portion and a combination of the first portion and the amplified second portion.

51. A system of generating acoustic and tactile signals from an electrical signal having audio information, comprising: a transducer, having a voice coil configured to receive an output electrical signal having information within a output range of frequencies, a diaphragm and a spider coupled to the voice coil, a rotation assembly including a socket, and a ball attached to a portion of the transducer, the ball being configured to fit within the socket, wherein the transducer is configured to rotate within the socket, and a mass element coupled to at least one of the voice coil and the diaphragm, and having a mass selected such that the resonant frequency of the transducer is within the output range of frequencies; and a controller, comprising a splitter for receiving an input electrical signal, and splitting the input electrical signal into at least a first portion having a first range of frequencies and a second portion having a second range of frequencies, wherein the resonant frequency is within the second range of frequencies, an amplifier, for amplifying the second portion, and a switch connected to the splitter and the amplifier, configured to receive the first portion, the amplified second portion and a combination of the first portion and the amplified second portion.

52. A method of generating acoustic and tactile signals from an electrical signal having information within a first range of frequencies, comprising: providing a transducer having a mass element disposed on a diaphragm of a speaker, wherein, the mass of the mass element is selected such that a portion of a resonant frequency range of the transducer falls within the first range of frequencies, and an echo chamber formed adjacent to the diaphragm; receiving, at the transducer, the electrical signals; generating, at the transducer, acoustic signals due to the vibration of the diaphragm, and haptic signals due to the resonance of the transducer created by the movement of the mass element at a frequency within the resonant frequency range, such that the haptic signals are amplified by the echo chamber.

53. The method of any one of the proceeding embodiments, wherein the speaker includes a voice coil for receiving the electrical signals, and a spider connected to the voice coil, the method further comprising damping, by the spider, the vibration of the diaphragm and the movement of the mass element.

54. A method of manufacturing a transducer capable of generating acoustic and haptic signals from an electrical signal, comprising: providing an acoustic transducer having a rigid diaphragm, spider and voice coil, attaching a mass element to the diaphragm by a holder, and attaching a semi-rigid diaphragm adjacent to the rigid diaphragm to form an echo chamber, wherein the mass element includes a rigid metal having a mass selected such that the resonant frequency of the acoustic transducer combined with the mass element falls within a range of frequencies of the electrical signal.

55. A method of manufacturing a transducer capable of generating acoustic and haptic signals from an electrical signal, comprising: providing an acoustic transducer having a rigid diaphragm, spider and voice coil, attaching a mass element to the diaphragm by a holder, and attaching a rotation assembly including a socket, and a ball to a portion of the transducer, the ball being configured to fit within the socket, wherein the transducer is configured to rotated within the socket, wherein the mass element includes a rigid metal having a mass selected such that the resonant frequency of the acoustic transducer combined with the mass element falls within a range of frequencies of the electrical signal.

56. A transducer capable of generating acoustic and haptic signals, comprising: a speaker, including a diaphragm, configured to transform an electrical signal having audio information in a first range of frequencies, into an acoustic signal, a holder attached to a portion of the diaphragm, the holder includes an opening positioned above a center region of the diaphragm, and a mass element attached to the holder above the center region of the diaphragm, the mass element having an opening positioned above the opening of the holder, wherein the mass of the mass element is selected such that a portion of a resonant frequency range of the combination of at least the speaker and the mass element falls within the first range of frequencies, and wherein the opening of the mass element and the opening of the holder are positioned such that at least a portion of the acoustic signal passes from the speaker and through the openings.

57. A transducer capable of generating haptic signals, the transducer comprising: a housing, wherein the housing transmits a haptic signal to a user through inertial vibrations; a speaker, including a diaphragm, and encased by the housing, configured to transform an electrical signal having audio information in a first range of frequencies into an acoustic signal; a mass element; and a holder, the holder located between the speaker and the mass element.

58. The transducer of any one of the proceeding embodiments, wherein the holder is positioned such that an area above a center region of the diaphragm between the speaker and the mass element remains open.

59. The transducer of any one of the proceeding embodiments, wherein a portion of the acoustic signal passes from the speaker and through an opening in the mass element.

60. The transducer of any one of the proceeding embodiments, wherein the holder prevents the mass element from contacting the diaphragm when vibrating.

61. The transducer of any one of the proceeding embodiments, wherein the holder comprises polyethylene foam.

62. The transducer of any one of the proceeding embodiments, further comprising a plurality of mass elements and a plurality of holders.

63. The transducer of any one of the proceeding embodiments, wherein the holder has an opening substantially concentric with the opening of the mass element.

64. The transducer of any one of the proceeding embodiments, wherein the holder does not have an opening substantially concentric with the opening of the mass element.

65. The transducer of any one of the proceeding embodiments, comprising a plurality of mass elements and a plurality of holders, positioned in anyone of the arrangements shown in FIG. 17.

66. A transducer capable of generating haptic signals, the transducer comprising: a housing, wherein the housing transmits a haptic signal to a user through inertial vibrations; a speaker, including a diaphragm, and encased by the housing; a mass element; and a holder, the holder located between the speaker and the mass element.

67. The transducer of any one of the proceeding embodiments, wherein the holder is positioned such that an area above a center region of the diaphragm between the speaker and the mass element remains open.

68. The transducer of any one of the proceeding embodiments, wherein an acoustic signal is prevented from passing from the speaker by the mass element or holder.

69. The transducer of any one of the proceeding embodiments, wherein the holder prevents the mass element from contacting the diaphragm when vibrating.

70. The transducer of anyone of the proceeding embodiments, wherein the holder comprises polyethylene foam.

71. The transducer of any one of the proceeding embodiments, further comprising a plurality of mass elements and a plurality of holders.

72. The transducer of any one of the proceeding embodiments, wherein the holder has an opening substantially concentric with the opening of the mass element.

73. The transducer of any one of the proceeding embodiments, wherein the holder does not have an opening substantially concentric with the opening of the mass element.

74. The transducer of any one of the proceeding embodiments, comprising a plurality of mass elements and a plurality of holders, positioned in anyone of the arrangements shown in FIG. 17.

75. A tangible, non-transitory, machine-readable medium storing instructions that, when executed by a data processing apparatus, cause the data processing apparatus to perform operations comprising those of anyone of the preceding embodiments.

76. A system comprising: one or more processors; and memory storing instructions that, when executed by the processors, cause the processors to effectuate operations comprising those of anyone of the preceding embodiments.

77. A system comprising means for performing anyone of the preceding embodiments.

I claim:

1. A transducer capable of generating haptic signals, the transducer comprising:

a housing, wherein the housing transmits a haptic signal to a user through inertial vibrations;

a speaker, including a diaphragm, and encased by the housing, configured to transform an electrical signal having audio information in a first range of frequencies into an acoustic signal;

a mass element; and a holder, the holder located between the speaker and the mass element.

2. The transducer of claim 1, wherein the holder is positioned such that an area above a center region of the diaphragm between the speaker and the mass element remains open.

3. The transducer of claim 1, wherein a portion of the acoustic signal passes from the speaker and through an opening in the mass element.

4. The transducer of claim 1, wherein the holder prevents the mass element from contacting the diaphragm when vibrating.

5. The transducer of claim 1, wherein the holder comprises polyethylene foam.

6. The transducer of claim 1, further comprising a plurality of mass elements and a plurality of holders.

7. The transducer of claim 1, wherein the holder has an opening substantially concentric with the opening of the mass element.

8. The transducer of claim 1, wherein the holder does not have an opening substantially concentric with the opening of the mass element.

9. The transducer of claim 1, comprising a plurality of mass elements and a plurality of holders, wherein the plurality of mass elements are different sizes.

10. The transducer of claim 1, comprising a plurality of mass elements and a plurality of holders, wherein the plurality of mass elements are different shapes.

11. A transducer capable of generating haptic signals, the transducer comprising:

a housing, wherein the housing transmits a haptic signal to a user through inertial vibrations;

a speaker, including a diaphragm, and encased by the housing;

a mass element; and a holder, the holder located between the speaker and the mass element.

12. The transducer of claim 11, wherein the holder is positioned such that an area above a center region of the diaphragm between the speaker and the mass element remains open.

13. The transducer of claim 11, wherein an acoustic signal is prevented from passing from the speaker by the mass element or holder.

14. The transducer of claim 11, wherein the holder prevents the mass element from contacting the diaphragm when vibrating.

15. The transducer of claim 11, wherein the holder comprises polyethylene foam.

16. The transducer of claim 11, further comprising a plurality of mass elements and a plurality of holders.

17. The transducer of claim 11, wherein the holder has an opening substantially concentric with the opening of the mass element.

18. The transducer of claim 11, wherein the holder does not have an opening substantially concentric with the opening of the mass element.

19. The transducer of claim 11, comprising a plurality of mass elements and a plurality of holders, wherein the plurality of mass elements are different sizes.

20. The transducer of claim 11, comprising a plurality of mass elements and a plurality of holders, wherein the plurality of mass elements are different shapes.

* * * * *